(12) United States Patent
Kim et al.

(10) Patent No.: US 12,506,552 B2
(45) Date of Patent: Dec. 23, 2025

(54) METHOD AND APPARATUS FOR ESTIMATING CHANNEL IN WIRELESS COMMUNICATION SYSTEM

(71) Applicant: LG ELECTRONICS INC., Seoul (KR)

(72) Inventors: Ilhwan Kim, Seoul (KR); Jong Ku Lee, Seoul (KR); Ikjoo Jung, Seoul (KR); Sung Ryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 812 days.

(21) Appl. No.: 17/776,510

(22) PCT Filed: Jul. 9, 2020

(86) PCT No.: PCT/KR2020/008996
§ 371 (c)(1),
(2) Date: May 12, 2022

(87) PCT Pub. No.: WO2021/112360
PCT Pub. Date: Jun. 10, 2021

(65) Prior Publication Data
US 2022/0393781 A1 Dec. 8, 2022

Related U.S. Application Data

(60) Provisional application No. 62/942,191, filed on Dec. 1, 2019.

(51) Int. Cl.
*H04B 17/373* (2015.01)
*G06N 3/04* (2023.01)
(Continued)

(52) U.S. Cl.
CPC .......... *H04B 17/373* (2015.01); *G06N 3/044* (2023.01); *G06N 3/08* (2013.01); *H04W 8/02* (2013.01)

(58) Field of Classification Search
None
See application file for complete search history.

(56) References Cited

U.S. PATENT DOCUMENTS 11,825,439 B2 * 11/2023 Hirzallah ............ H04W 64/006
12,213,097 B2 * 1/2025 Hirzallah ............ G01S 5/0278
(Continued)

FOREIGN PATENT DOCUMENTS

KR 1020100124677 A 11/2010
KR 10-2016-0146947 A 12/2016
(Continued)

*Primary Examiner* — Pablo N Tran
(74) *Attorney, Agent, or Firm* — BRYAN CAVE LEIGHTON PAISNER LLP

(57) ABSTRACT

The present disclosure relates to a method for operating a terminal and a base station in a wireless communication system and an apparatus for supporting the same. In an embodiment of the present disclosure, a method for operating a terminal in a wireless communication system may include: transmitting a first message including information related to learning; receiving a second message including configuration information for learning; transmitting an uplink reference signal; and transmitting channel information related to a downlink channel measured based on a downlink reference signal.

20 Claims, 35 Drawing Sheets

(51) Int. Cl.
    *G06N 3/044*        (2023.01)
    *G06N 3/08*          (2023.01)
    *H04W 8/02*         (2009.01)

(56) References Cited

U.S. PATENT DOCUMENTS

| | | |
|---|---|---|
| 2012/0084238 A1 | 4/2012 | Kristal et al. |
| 2018/0102956 A1 | 4/2018 | Amini et al. |

FOREIGN PATENT DOCUMENTS

| | | |
|---|---|---|
| KR | 10-2019-0087351 A | 7/2019 |
| KR | 10-2019-0126025 A | 11/2019 |

\* cited by examiner

METHOD AND APPARATUS FOR ESTIMATING CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2020/008996, filed on Jul. 9, 2020, which claims the benefit of U.S. Provisional Application No. 62/942,191 filed on Dec. 1, 2019, the contents of which are all incorporated by reference herein in their entirety.

BACKGROUND OF THE INVENTION

Field of the Invention

The present disclosure relates to a wireless communication system and, more particularly, to a method and apparatus for estimating a channel in a wireless communication system.

Description of the Related Art

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure relates to a method and apparatus for estimating a channel more efficiently in a wireless communication system.

The present disclosure relates to a method and apparatus for estimating a channel based on machine learning in a wireless communication system.

The present disclosure relates to a method and apparatus for supporting machine learning for channel estimation in a wireless communication system.

The technical objects to be achieved in the present disclosure are not limited to the above-mentioned technical objects, and other technical objects that are not mentioned may be considered by those skilled in the art through the embodiments described below.

Technical Solution

In an embodiment of the present disclosure, a method for operating a terminal in a wireless communication system may include: transmitting a first message including information related to learning; receiving a second message including configuration information for learning; transmitting an uplink reference signal; and transmitting channel information related to a downlink channel measured based on a downlink reference signal.

In an embodiment of the present disclosure, a method for operating a base station in a wireless communication system may include: receiving, from a terminal, a first message including information related to learning; transmitting, to the terminal, a second message including configuration information for learning; receiving, from the terminal, an uplink reference signal; receiving, from the terminal, first channel information related to a downlink channel measured based on a downlink reference signal; and performing learning for a machine learning model for estimating a downlink channel using second channel information which is measured based on the first channel information and an uplink reference signal.

In an embodiment of the present disclosure, a terminal in a wireless communication system may include a transceiver and a processor coupled with the transceiver. The processor may be configured to: transmit a first message including information related to learning, receive a second message including configuration information for learning, transmit an uplink reference signal, and transmit channel information related to a downlink channel measured based on a downlink reference signal.

In an embodiment of the present disclosure, a base station in a wireless communication system may include a transceiver and a processor coupled with the transceiver. The processor may be configured to: receive, from a terminal, a first message including information related to learning, transmit, to the terminal, a second message including configuration information for learning, receive, from the terminal, an uplink reference signal, receive, from the terminal, first channel information related to a downlink channel measured based on a downlink reference signal, and perform learning for a machine learning model for estimating a downlink channel using second channel information measured based on an uplink reference signal.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

Advantageous Effects

The following effects may be produced by embodiments based on the present disclosure.

According to the present disclosure, the learning of a machine learning model for estimating a channel during operation in a wireless communication system may be effectively implemented.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

DESCRIPTION OF DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

MODE FOR INVENTION

Figure 1:
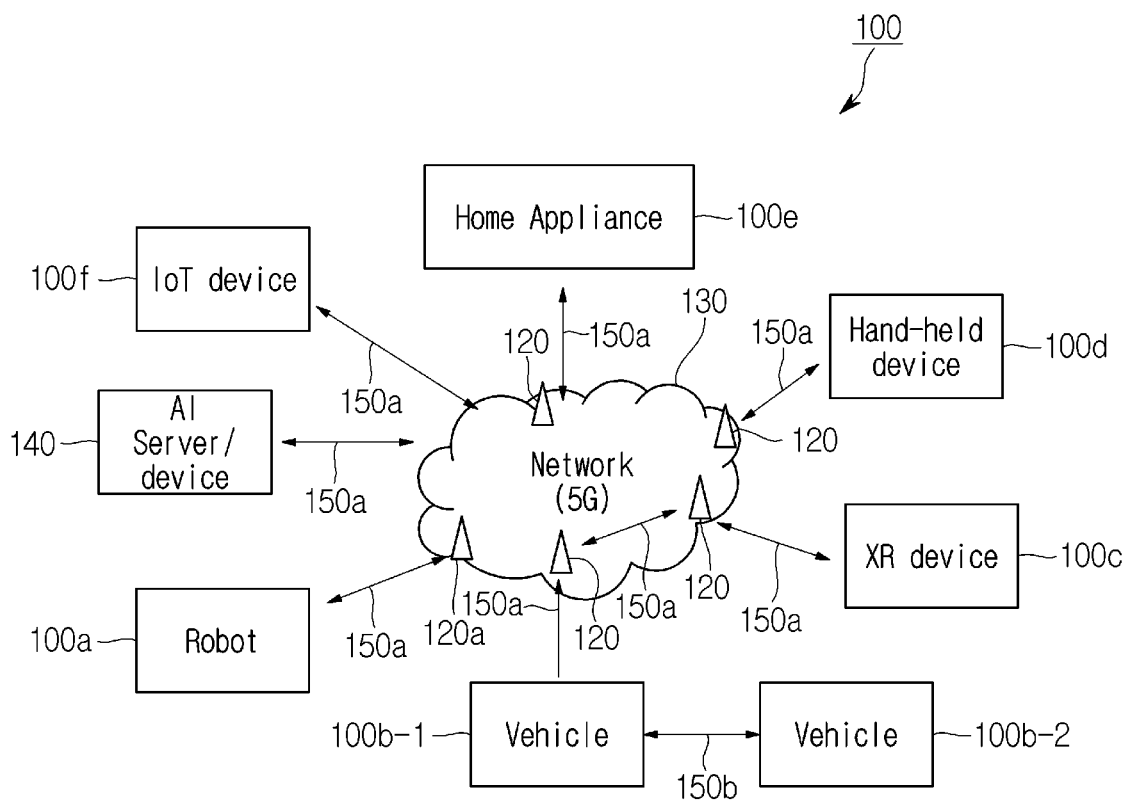
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL). Likewise, the mobile station may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, 3GPP $5^{th}$ generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include a unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Wireless Device Applicable to the Present Disclosure

Figure 2:
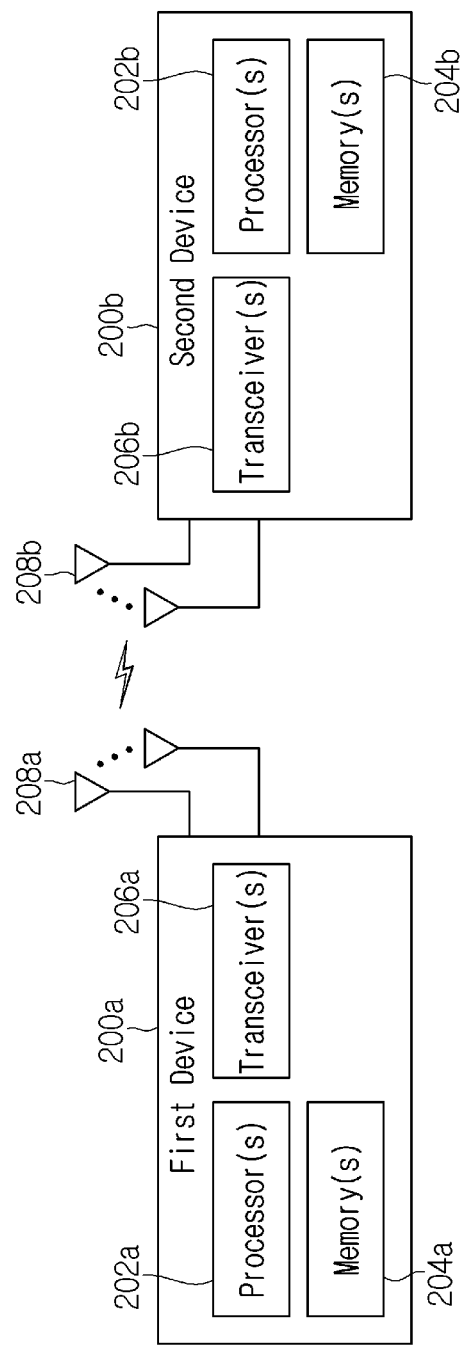
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be connected with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be connected with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Structure of Wireless Device Applicable to the Present Disclosure

Figure 3:
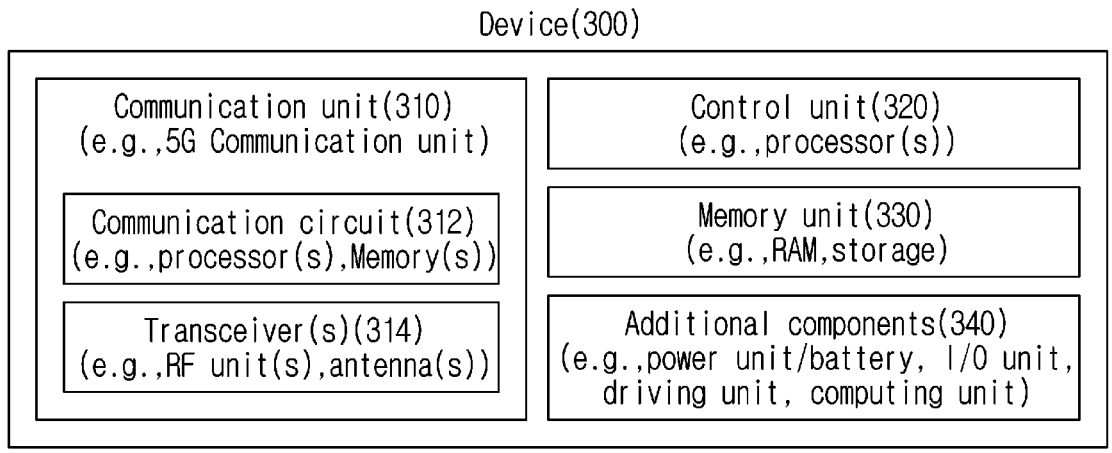
FIG. 3 is a view showing another example of a wireless device applicable to the present disclosure.

FIG. 3 is a view showing another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically connected with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIG. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be connected with each other through wired interfaces or at least some thereof may be wirelessly connected through the communication unit 310. For example, in the wireless device 300, the control unit 320 and the communication unit 310 may be connected by wire, and the control unit 320 and the first unit (e.g., 130 or 140) may be wirelessly connected through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
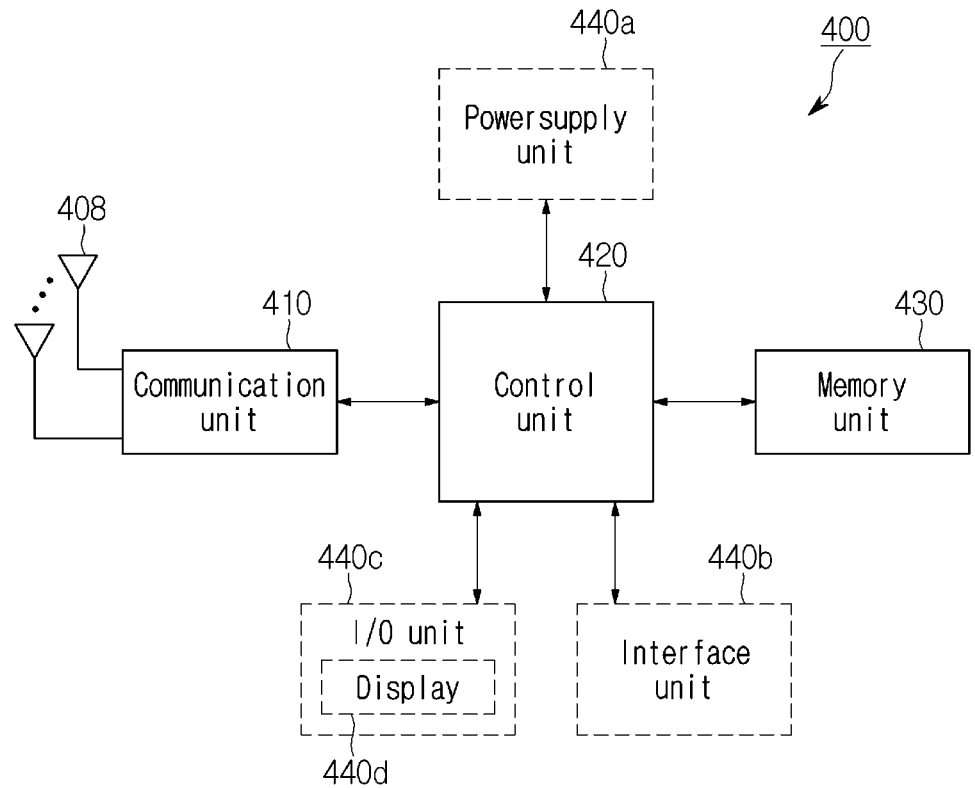
FIG. 4 is a view showing an example of a hand-held device applicable to the present disclosure.

FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440a, an interface unit (interface) 440b, and an input/output unit 440c. An antenna unit (antenna) 408 may be part of the communication unit 410. The blocks 410 to 430/440a to 440c may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440a may supply power to the hand-held device 400 and include a wired/wireless charging circuit, a battery, etc. The interface unit 440b may support connection between the hand-held device 400 and another external device. The interface unit 440b may include various ports (e.g., an audio input/output port and a video input/output port) for connection with the external device. The input/output unit 440c may receive or output video information/signals, audio information/signals, data and/or user input information. The input/output unit 440c may include a camera, a microphone, a user input unit, a display 440d, a speaker and/or a haptic module.

For example, in case of data communication, the input/output unit 440c may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440c in various forms (e.g., text, voice, image, video and haptic).

Type of Wireless Device Applicable to the Present Disclosure

Figure 5:
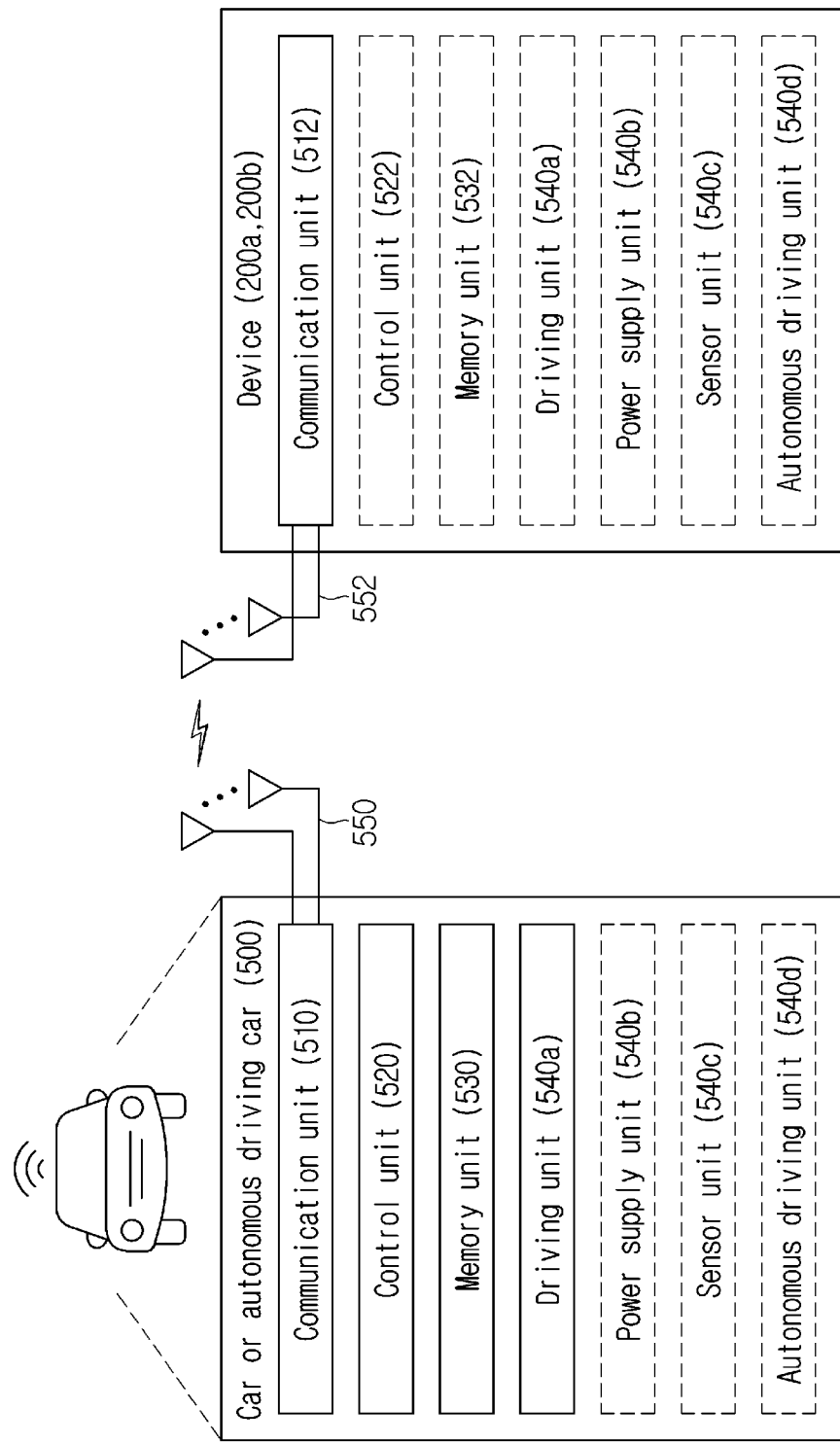
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540a, a power supply unit (power supply) 540b, a sensor unit 540c, and an autonomous driving unit 540d. The antenna unit 550 may be configured as part of the communication unit 510. The blocks 510/530/540a to 540d correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU). The driving unit 540a may drive the car or autonomous driving car 500 on the ground. The driving unit 540a may include an engine, a motor, a power train, wheels, a brake, a steering device, etc. The power supply unit 540b may supply power to the car or autonomous driving car 500, and include a wired/wireless charging circuit, a battery, etc. The sensor unit 540c may obtain a vehicle state, surrounding environment information, user information, etc. The sensor unit 540c may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 540d may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 510 may receive map data, traffic information data, etc. from an external server. The autonomous driving unit 540d may generate an autonomous driving route and a driving plan based on the acquired data. The control unit 520 may control the driving unit 540a (e.g., speed/direction control) such that the car or autonomous driving car 500 moves along the autonomous driving route according to the driving plane. During autonomous driving, the communication unit 510 may aperiodically/periodically acquire latest traffic information data from an external server and acquire surrounding traffic information data from neighboring cars. In addition, during autonomous driving, the sensor unit 540*c* may acquire a vehicle state and surrounding environment information. The autonomous driving unit 540*d* may update the autonomous driving route and the driving plan based on newly acquired data/information. The communication unit 510 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Figure 6:
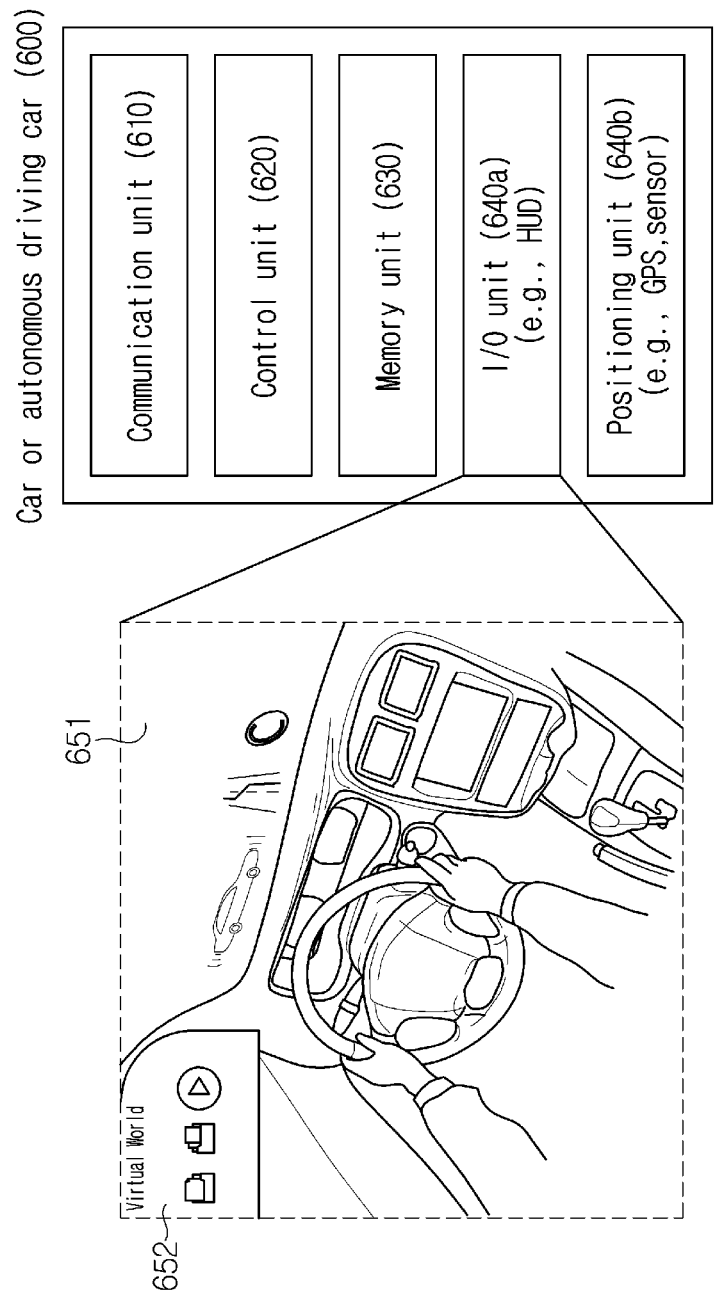
FIG. 6 is a view showing an example of a mobility applicable to the present disclosure.

FIG. 6 is a view showing an example of a mobility applicable to the present disclosure.

Referring to FIG. 6, the mobility applied to the present disclosure may be implemented as at least one of a transportation means, a train, an aerial vehicle or a ship. In addition, the mobility applied to the present disclosure may be implemented in the other forms and is not limited to the above-described embodiments.

At this time, referring to FIG. 6, the mobility 600 may include a communication unit (transceiver) 610, a control unit (controller) 620, a memory unit (memory) 630, an input/output unit 640*a* and a positioning unit 640*b*. Here, the blocks 610 to 630/640*a* to 640*b* may corresponding to the blocks 310 to 330/340 of FIG. 3.

The communication unit 610 may transmit and receive signals (e.g., data, control signals, etc.) to and from external devices such as another mobility or a base station. The control unit 620 may control the components of the mobility 600 to perform various operations. The memory unit 630 may store data/parameters/programs/code/instructions supporting the various functions of the mobility 600. The input/output unit 640*a* may output AR/VR objects based on information in the memory unit 630. The input/output unit 640*a* may include a HUD. The positioning unit 640*b* may acquire the position information of the mobility 600. The position information may include absolute position information of the mobility 600, position information in a driving line, acceleration information, position information of neighboring vehicles, etc. The positioning unit 640*b* may include a global positioning system (GPS) and various sensors.

For example, the communication unit 610 of the mobility 600 may receive map information, traffic information, etc. from an external server and store the map information, the traffic information, etc. in the memory unit 630. The positioning unit 640*b* may acquire mobility position information through the GPS and the various sensors and store the mobility position information in the memory unit 630. The control unit 620 may generate a virtual object based on the map information, the traffic information, the mobility position information, etc., and the input/output unit 640*a* may display the generated virtual object in a glass window (651 and 652). In addition, the control unit 620 may determine whether the mobility 600 is normally driven in the driving line based on the mobility position information. When the mobility 600 abnormally deviates from the driving line, the control unit 620 may display a warning on the glass window of the mobility through the input/output unit 640*a*. In addition, the control unit 620 may broadcast a warning message for driving abnormality to neighboring mobilities through the communication unit 610. Depending on situations, the control unit 620 may transmit the position information of the mobility and information on driving/mobility abnormality to a related institution through the communication unit 610.

Figure 7:
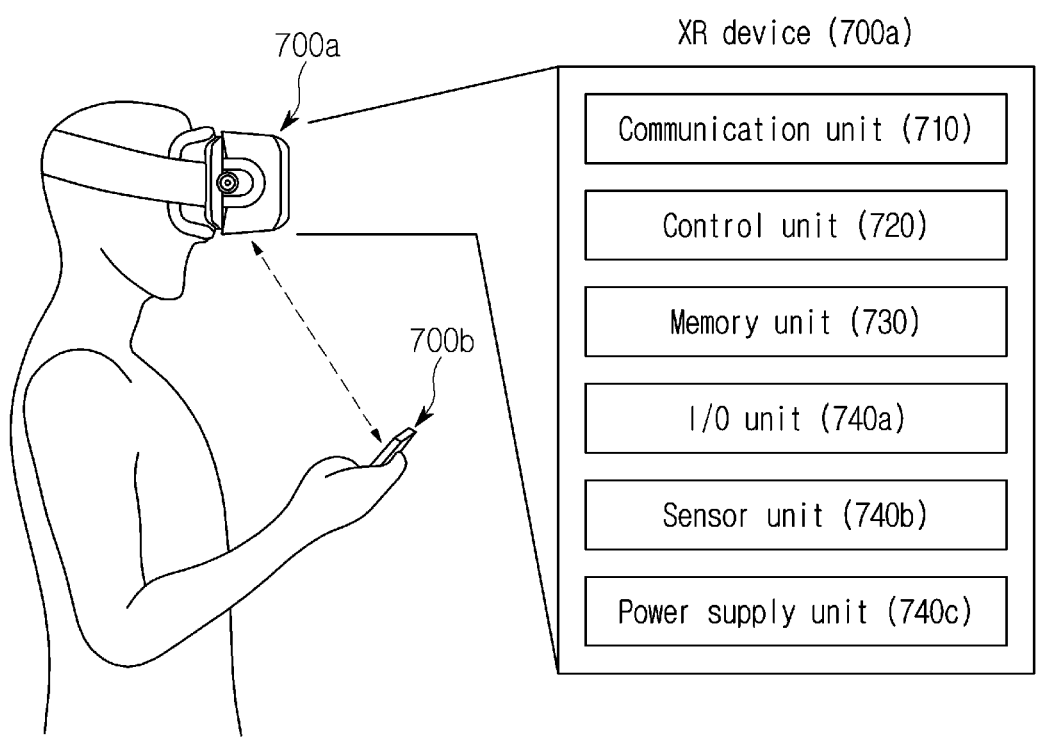
FIG. 7 is a view showing an example of an XR device applicable to the present disclosure.

FIG. 7 is a view showing an example of an XR device applicable to the present disclosure. The XR device may be implemented as a HMD, a head-up display (HUD) provided in a vehicle, a television, a smartphone, a computer, a wearable device, a home appliance, a digital signage, a vehicle, a robot, etc.

Referring to FIG. 7, the XR device 700*a* may include a communication unit (transceiver) 710, a control unit (controller) 720, a memory unit (memory) 730, an input/output unit 740*a*, a sensor unit 740*b* and a power supply unit (power supply) 740*c*. Here, the blocks 710 to 730/740*a* to 740*c* may correspond to the blocks 310 to 330/340 of FIG. 3, respectively.

The communication unit 710 may transmit and receive signals (e.g., media data, control signals, etc.) to and from external devices such as another wireless device, a hand-held device or a media server. The media data may include video, image, sound, etc. The control unit 720 may control the components of the XR device 700*a* to perform various operations. For example, the control unit 720 may be configured to control and/or perform procedures such as video/image acquisition, (video/image) encoding, metadata generation and processing. The memory unit 730 may store data/parameters/programs/code/instructions necessary to drive the XR device 700*a* or generate an XR object.

The input/output unit 740*a* may acquire control information, data, etc. from the outside and output the generated XR object. The input/output unit 740*a* may include a camera, a microphone, a user input unit, a display, a speaker and/or a haptic module. The sensor unit 740*b* may obtain an XR device state, surrounding environment information, user information, etc. The sensor unit 740*b* may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar. The power supply unit 740*c* may supply power to the XR device 700*a* and include a wired/wireless charging circuit, a battery, etc.

For example, the memory unit 730 of the XR device 700*a* may include information (e.g., data, etc.) necessary to generate an XR object (e.g., AR/VR/MR object). The input/output unit 740*a* may acquire an instruction for manipulating the XR device 700*a* from a user, and the control unit 720 may drive the XR device 700*a* according to the driving instruction of the user. For example, when the user wants to watch a movie, news, etc. through the XR device 700*a*, the control unit 720 may transmit content request information to another device (e.g., a hand-held device 700*b*) or a media server through the communication unit 730. The communication unit 730 may download/stream content such as a movie or news from another device (e.g., the hand-held device 700*b*) or the media server to the memory unit 730. The control unit 720 may control and/or perform procedures such as video/image acquisition, (video/image) encoding, metadata generation/processing, etc. with respect to content, and generate/output an XR object based on information on a surrounding space or a real object acquired through the input/output unit 740*a* or the sensor unit 740*b*.

In addition, the XR device 700*a* may be wirelessly connected with the hand-held device 700*b* through the communication unit 710, and operation of the XR device 700*a* may be controlled by the hand-held device 700*b*. For example, the hand-held device 700*b* may operate as a controller for the XR device 700*a*. To this end, the XR device 700*a* may acquire three-dimensional position information of the hand-held device 700*b* and then generate and output an XR object corresponding to the hand-held device 700*b*.

Figure 8:
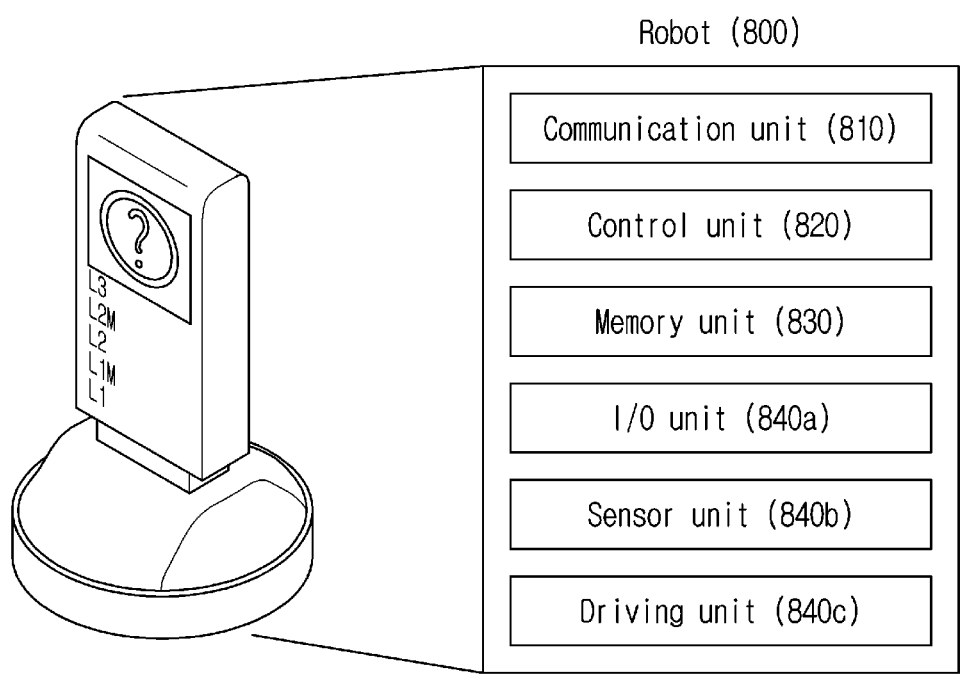
FIG. 8 is a view showing an example of a robot applicable to the present disclosure.

FIG. 8 is a view showing an example of a robot applicable to the present disclosure. For example, the robot may be classified into industrial, medical, household, military, etc. according to the purpose or field of use. At this time, referring to FIG. 8, the robot 800 may include a communication unit (transceiver) 810, a control unit (controller) 820, a memory unit (memory) 830, an input/output unit 840*a*, sensor unit 840*b* and a driving unit 840*c*. Here, blocks 810 to 830/840*a* to 840*c* may correspond to the blocks 310 to 330/340 of FIG. 3, respectively.

The communication unit 810 may transmit and receive signals (e.g., driving information, control signals, etc.) to and from external devices such as another wireless device, another robot or a control server. The control unit 820 may control the components of the robot 800 to perform various operations. The memory unit 830 may store data/parameters/programs/code/instructions supporting various functions of the robot 800. The input/output unit 840*a* may acquire information from the outside of the robot 800 and output information to the outside of the robot 800. The input/output unit 840*a* may include a camera, a microphone, a user input unit, a display, a speaker and/or a haptic module.

The sensor unit 840*b* may obtain internal information, surrounding environment information, user information, etc. of the robot 800. The sensor unit 840*b* may include a proximity sensor, an illumination sensor, an acceleration sensor, a magnetic sensor, a gyro sensor, an inertia sensor, an infrared (IR) sensor, a finger scan sensor, an ultrasonic sensor, an optical sensor, a microphone and/or a radar.

The driving unit 840*c* may perform various physical operations such as movement of robot joints. In addition, the driving unit 840*c* may cause the robot 800 to run on the ground or fly in the air. The driving unit 840*c* may include an actuator, a motor, wheels, a brake, a propeller, etc.

Figure 9:
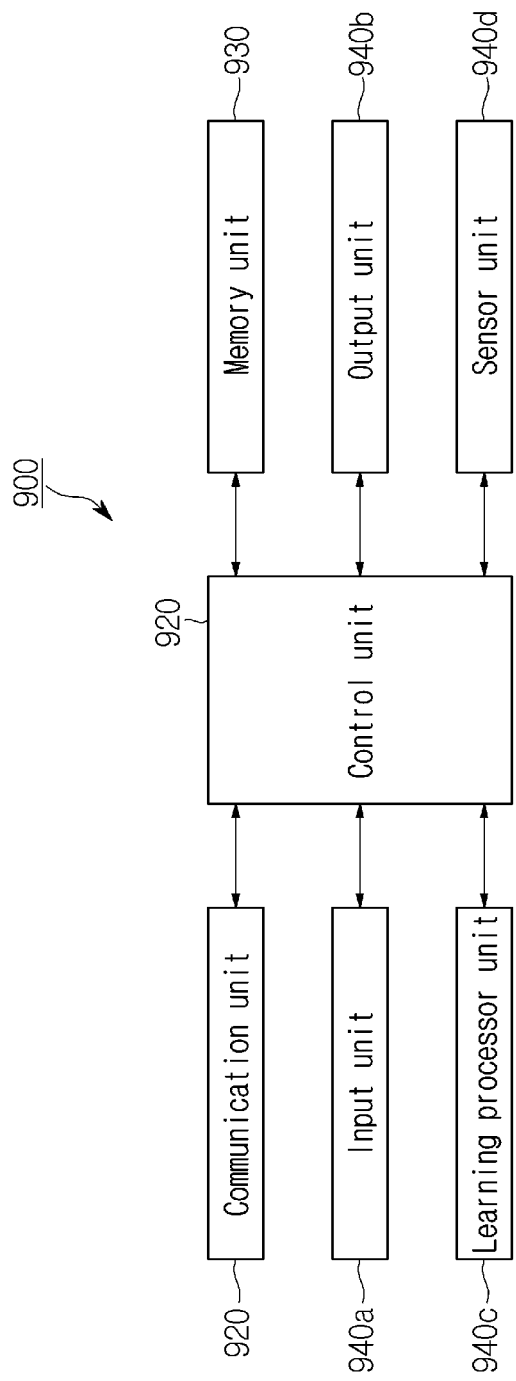
FIG. 9 is a view showing an example of artificial intelligence (AI) device applicable to the present disclosure.

FIG. 9 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 9, the AI device 900 may include a communication unit (transceiver) 910, a control unit (controller) 920, a memory unit (memory) 930, an input/output unit 940*a*/940*b*, a leaning processor unit (learning processor) 940*c* and a sensor unit 940*d*. The blocks 910 to 930/940*a* to 940*d* may correspond to the blocks 310 to 330/340 of FIG. 3, respectively.

The communication unit 910 may transmit and receive wired/wireless signals (e.g., sensor information, user input, learning models, control signals, etc.) to and from external devices such as another AI device (e.g., FIG. 1, 100*x*, 120 or 140) or the AI server (FIG. 1, 140) using wired/wireless communication technology. To this end, the communication unit 910 may transmit information in the memory unit 930 to an external device or transfer a signal received from the external device to the memory unit 930.

The control unit 920 may determine at least one executable operation of the AI device 900 based on information determined or generated using a data analysis algorithm or a machine learning algorithm. In addition, the control unit 920 may control the components of the AI device 900 to perform the determined operation. For example, the control unit 920 may request, search for, receive or utilize the data of the learning processor unit 940*c* or the memory unit 930, and control the components of the AI device 900 to perform predicted operation or operation, which is determined to be desirable, of at least one executable operation. In addition, the control unit 920 may collect history information including operation of the AI device 900 or user's feedback on the operation and store the history information in the memory unit 930 or the learning processor unit 940*c* or transmit the history information to the AI server (FIG. 1, 140). The collected history information may be used to update a learning model.

The memory unit 930 may store data supporting various functions of the AI device 900. For example, the memory unit 930 may store data obtained from the input unit 940*a*, data obtained from the communication unit 910, output data of the learning processor unit 940*c*, and data obtained from the sensing unit 940. In addition, the memory unit 930 may store control information and/or software code necessary to operate/execute the control unit 920.

The input unit 940*a* may acquire various types of data from the outside of the AI device 900. For example, the input unit 940*a* may acquire learning data for model learning, input data, to which the learning model will be applied, etc. The input unit 940*a* may include a camera, a microphone and/or a user input unit. The output unit 940*b* may generate video, audio or tactile output. The output unit 940*b* may include a display, a speaker and/or a haptic module. The sensing unit 940 may obtain at least one of internal information of the AI device 900, the surrounding environment information of the AI device 900 and user information using various sensors. The sensing unit 940 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 940*c* may train a model composed of an artificial neural network using training data. The learning processor unit 940*c* may perform AI processing along with the learning processor unit of the AI server (FIG. 1, 140). The learning processor unit 940*c* may process information received from an external device through the communication unit 910 and/or information stored in the memory unit 930. In addition, the output value of the learning processor unit 940*c* may be transmitted to the external device through the communication unit 910 and/or stored in the memory unit 930.

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

Figure 10:
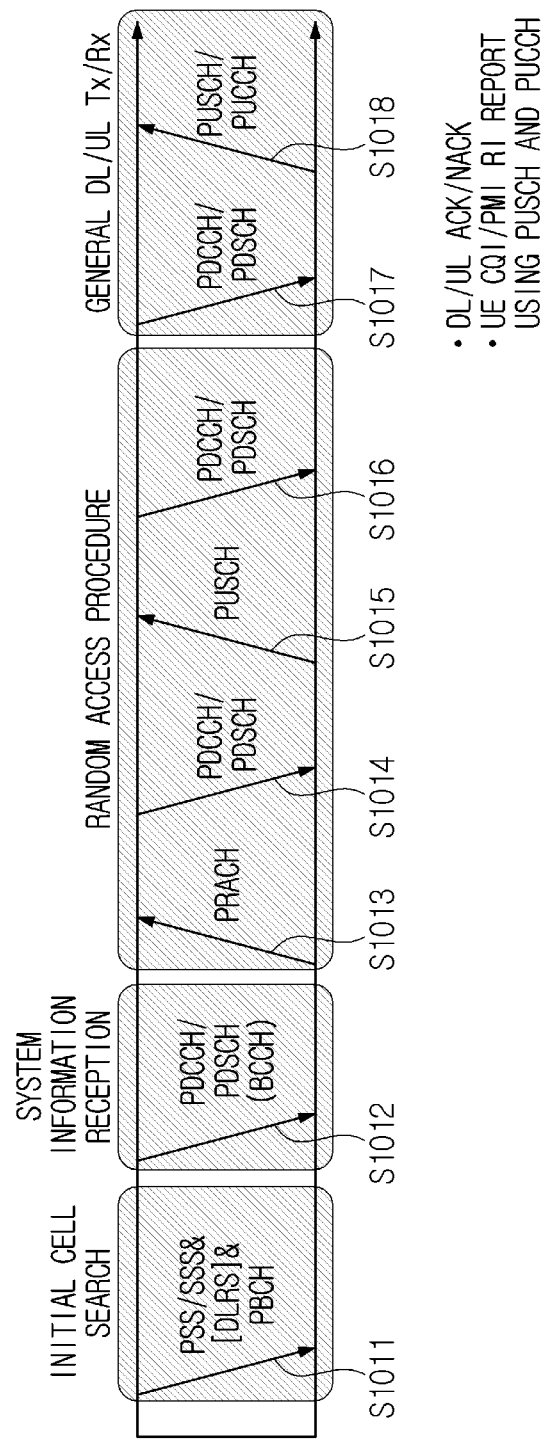
FIG. 10 is a view showing physical channels applicable to the present disclosure and a signal transmission method using the same.

FIG. 10 is a view showing physical channels applicable to the present disclosure and a signal transmission method using the same.

The UE which is turned on again in a state of being turned off or has newly entered a cell performs initial cell search operation in step S1011 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S1012, thereby acquiring more detailed system information.

Thereafter, the UE may perform a random access procedure such as steps S1013 to S1016 in order to complete access to the base station. To this end, the UE may transmit a preamble through a physical random access channel (PRACH) (S1013) and receive a random access response (RAR) to the preamble through a physical downlink control channel and a physical downlink shared channel corresponding thereto (S1014). The UE may transmit a physical uplink shared channel (PUSCH) using scheduling information in the RAR (S1015) and perform a contention resolution procedure such as reception of a physical downlink control channel signal and a physical downlink shared channel signal corresponding thereto (S1016).

The UE, which has performed the above-described procedures, may perform reception of a physical downlink control channel signal and/or a physical downlink shared channel signal (S1017) and transmission of a physical uplink shared channel (PUSCH) signal and/or a physical uplink control channel (PUCCH) signal (S1018) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 11:
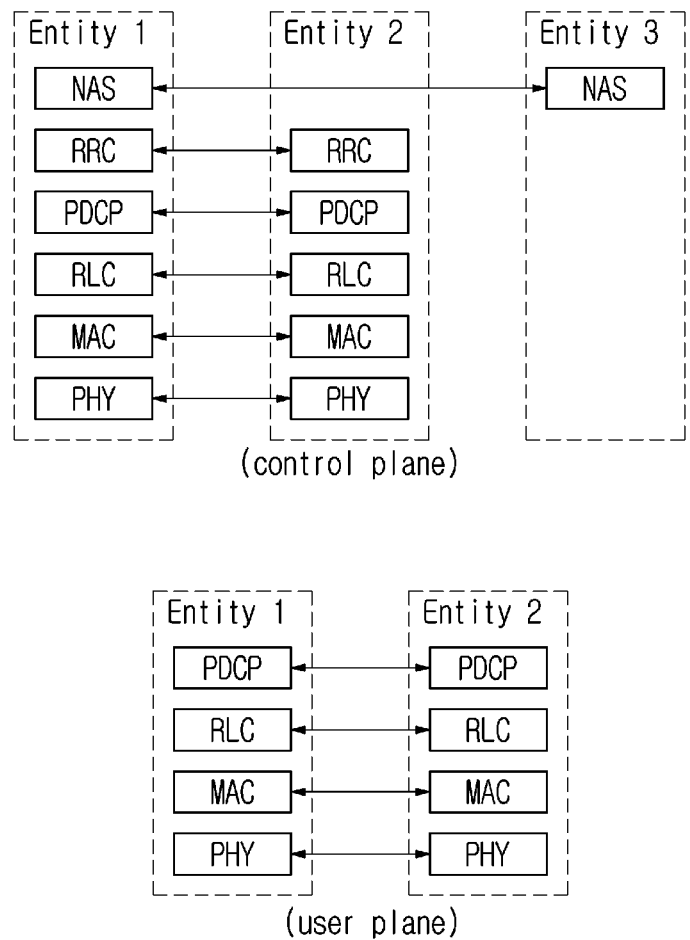
FIG. 11 is a view showing the structure of a control plane and a user plane of a radio interface protocol applicable to the present disclosure.

FIG. 11 is a view showing the structure of a control plane and a user plane of a radio interface protocol applicable to the present disclosure.

Referring to FIG. 11, Entity 1 may be a user equipment (UE). At this time, the UE may be at least one of a wireless device, a hand-held device, a vehicle, a mobility, an XR device, a robot or an AI device, to which the present disclosure is applicable in FIGS. 1 to 9. In addition, the UE refers to a device, to which the present disclosure is applicable, and is not limited to a specific apparatus or device.

Entity 2 may be a base station. At this time, the base station may be at least one of an eNB, a gNB or an ng-eNB. In addition, the base station may refer to a device for transmitting a downlink signal to a UE and is not limited to a specific apparatus or device. That is, the base station may be implemented in various forms or types and is not limited to a specific form.

Entity 3 may be a device for performing a network apparatus or a network function. At this time, the network apparatus may be a core network node (e.g., mobility management entity (MME) for managing mobility, an access and mobility management function (AMF), etc. In addition, the network function may mean a function implemented in order to perform a network function. Entity 3 may be a device, to which a function is applied. That is, Entity 3 may refer to a function or device for performing a network function and is not limited to a specific device.

A control plane refers to a path used for transmission of control messages, which are used by the UE and the network to manage a call. A user plane refers to a path in which data generated in an application layer, e.g. voice data or Internet packet data, is transmitted. At this time, a physical layer which is a first layer provides an information transfer service to a higher layer using a physical channel. The physical layer is connected to a media access control (MAC) layer of a higher layer via a transmission channel. At this time, data is transmitted between the MAC layer and the physical layer via the transmission channel. Data is also transmitted between a physical layer of a transmitter and a physical layer of a receiver via a physical channel. The physical channel uses time and frequency as radio resources.

The MAC layer which is a second layer provides a service to a radio link control (RLC) layer of a higher layer via a logical channel. The RLC layer of the second layer supports reliable data transmission. The function of the RLC layer may be implemented by a functional block within the MAC layer. A packet data convergence protocol (PDCP) layer which is the second layer performs a header compression function to reduce unnecessary control information for efficient transmission of an Internet protocol (IP) packet such as an IPv4 or IPv6 packet in a radio interface having relatively narrow bandwidth. A radio resource control (RRC) layer located at the bottommost portion of a third layer is defined only in the control plane. The RRC layer serves to control logical channels, transmission channels, and physical channels in relation to configuration, re-configuration, and release of radio bearers. A radio bearer (RB) refers to a service provided by the second layer to transmit data between the UE and the network. To this end, the RRC layer of the UE and the RRC layer of the network exchange RRC messages. A non-access stratum (NAS) layer located at a higher level of the RRC layer performs functions such as session management and mobility management. One cell configuring a base station may be set to one of various bandwidths to provide a downlink or uplink transmission service to several UEs. Different cells may be set to provide different bandwidths. Downlink transmission channels for transmitting data from a network to a UE may include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at a higher level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 12:
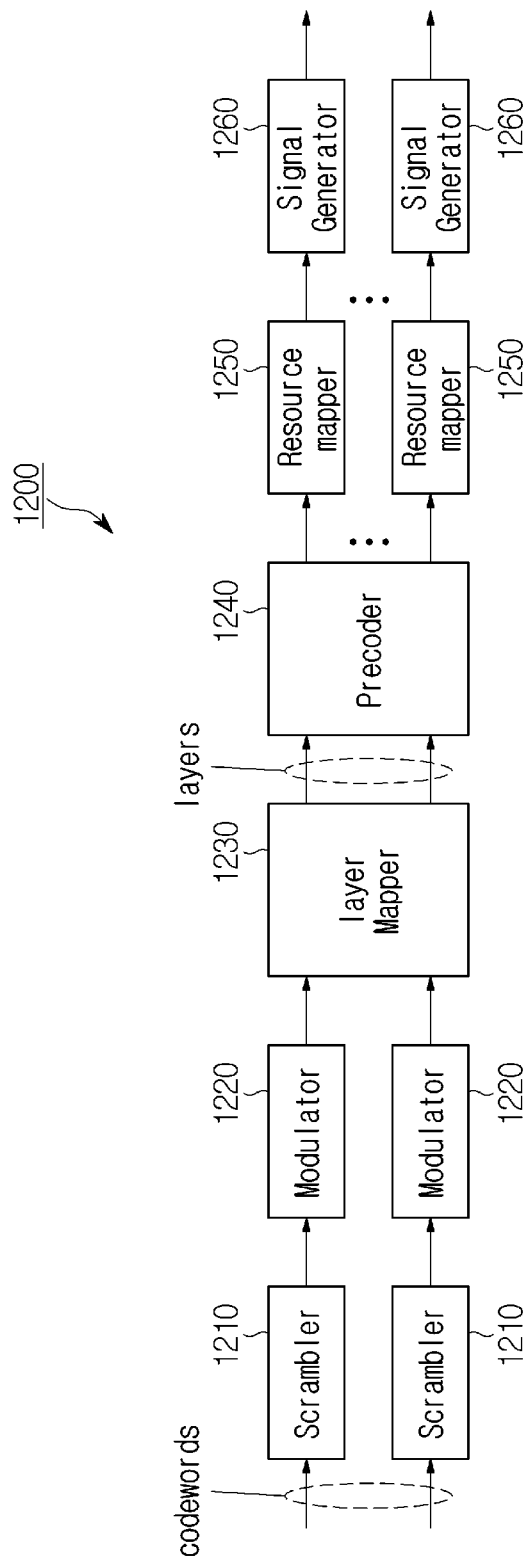
FIG. 12 is a view showing a method of processing a transmitted signal applicable to the present disclosure.

FIG. 12 is a view showing a method of processing a transmitted signal applicable to the present disclosure. For example, the transmitted signal may be processed by a signal processing circuit. At this time, a signal processing circuit 1200 may include a scrambler 1210, a modulator 1220, a layer mapper 1230, a precoder 1240, a resource mapper 1250, and a signal generator 1260. At this time, for example, the operation/function of FIG. 12 may be performed by the processors 202a and 202b and/or the transceiver 206a and 206b of FIG. 2. In addition, for example, the hardware element of FIG. 12 may be implemented in the processors 202a and 202b of FIG. 2 and/or the transceivers 206a and 206b of FIG. 2. For example, blocks 1010 to 1060 may be implemented in the processors 202a and 202b of FIG. 2. In addition, blocks 1210 to 1250 may be implemented in the processors 202a and 202b of FIG. 2 and a block 1260 may be implemented in the transceivers 206a and 206b of FIG. 2, without being limited to the above-described embodiments.

A codeword may be converted into a radio signal through the signal processing circuit 1200 of FIG. 12. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 1210. The scramble sequence used for scramble is generated based in an initial value and the initial value may include ID information of a wireless device, etc. The scrambled bit sequence may be modulated into a modulated symbol sequence by the modulator 1220. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 1230. Modulation symbols of each transport layer may be mapped to corresponding antenna port(s) by the precoder 1240 (precoding). The output z of the precoder 1240 may be obtained by multiplying the output y of the layer mapper 1230 by an N*M precoding matrix W. Here, N may be the number of antenna ports and M may be the number of transport layers. Here, the precoder 1240 may perform precoding after transform precoding (e.g., discrete Fourier transform (DFT)) for complex modulation symbols. In addition, the precoder 1240 may perform precoding without performing transform precoding.

The resource mapper 1250 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 1260 may generate a radio signal from the mapped modulation symbols, and the generated radio signal may be transmitted to another device through each antenna. To this end, the signal generator 1260 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 1210 to 1260 of FIG. 12. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Figure 13:
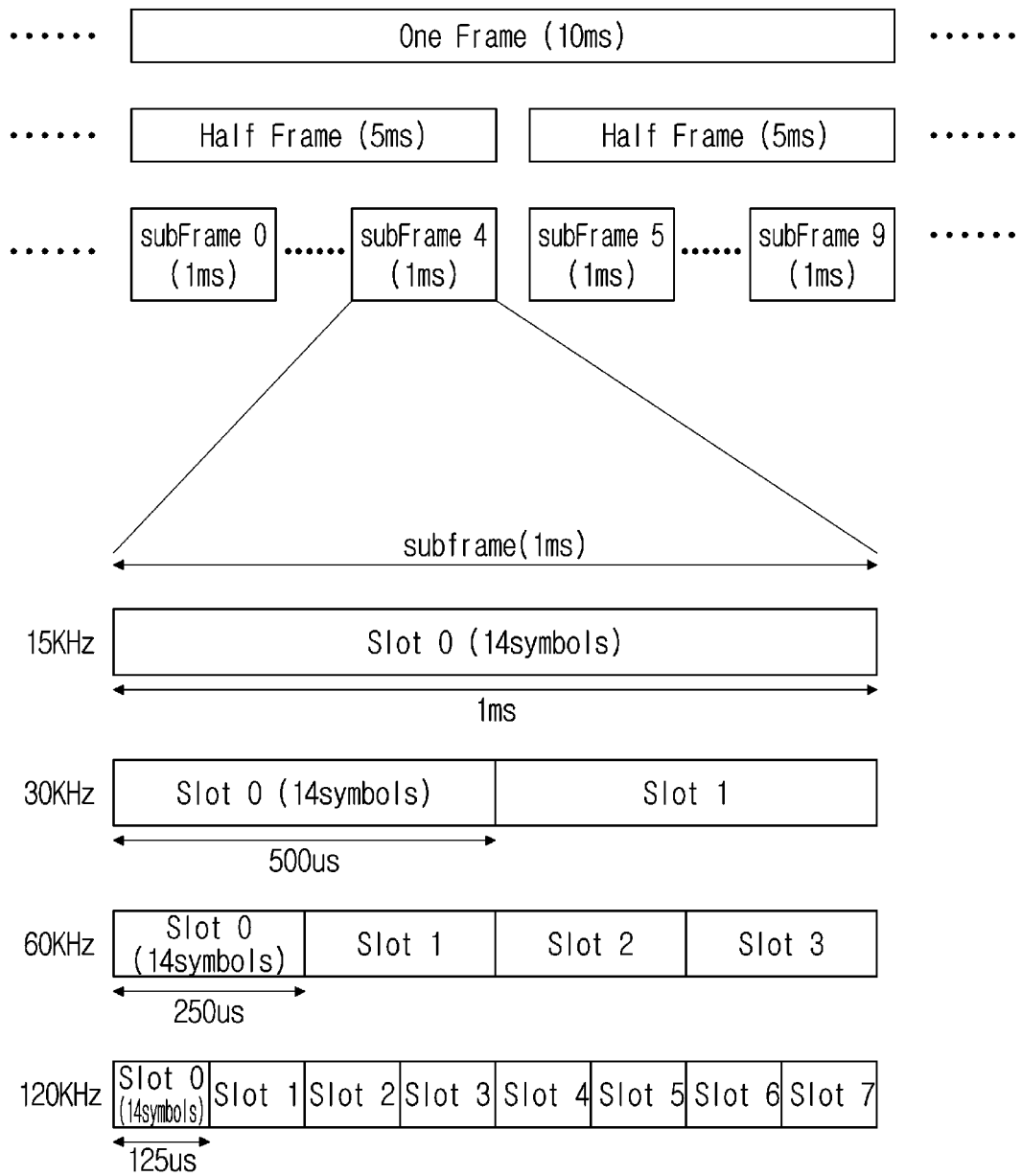
FIG. 13 is a view showing the structure of a radio frame applicable to the present disclosure.

FIG. 13 is a view showing the structure of a radio frame applicable to the present disclosure.

UL and DL transmission based on an NR system may be based on the frame shown in FIG. 13. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above, $N^{slot}_{symb}$ may indicate the number of symbols in a slot, $N^{frame,\mu}_{slot}$ may indicate the number of slots in a frame, and $N^{subframe,\mu}_{slot}$ may indicate the number of slots in a subframe.

In addition, in a system, to which the present disclosure is applicable, OFDM(A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 14:
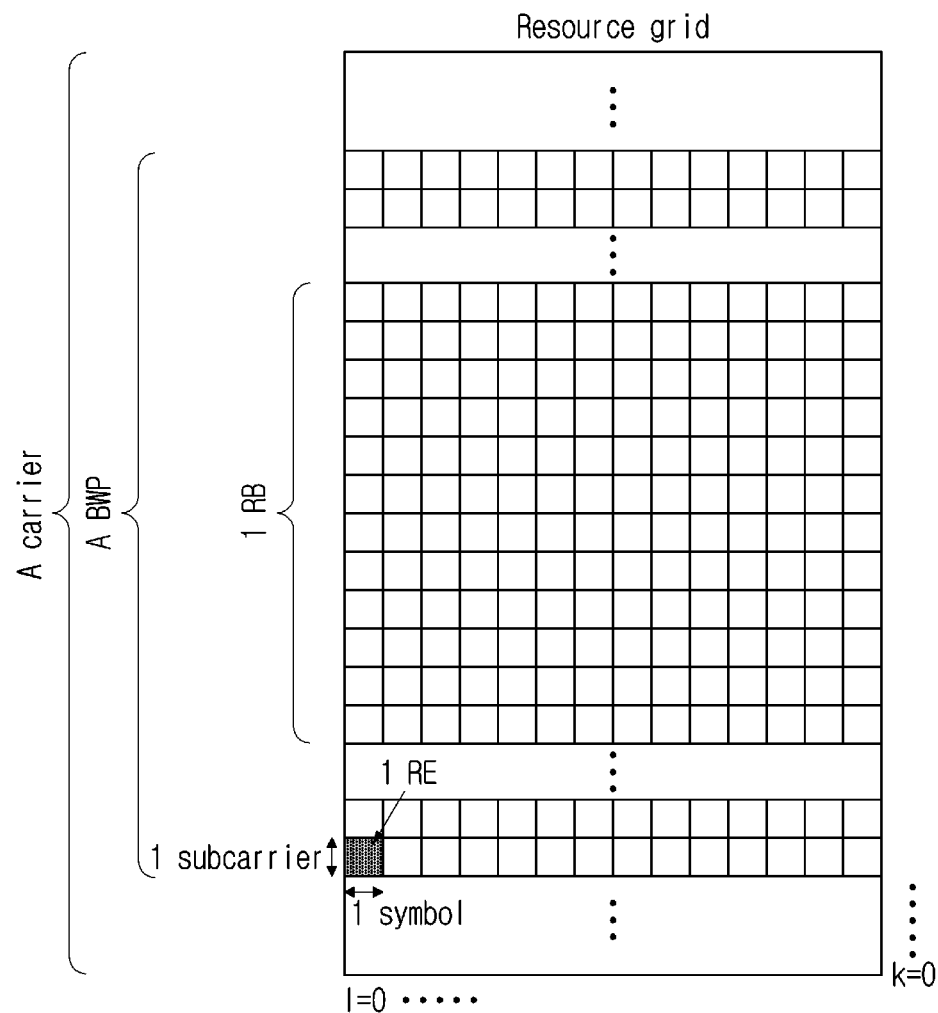
FIG. 14 is a view showing a slot structure applicable to the present disclosure.

FIG. 14 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| Per device peak data rate | 1 Tbps |
| --- | --- |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 15:
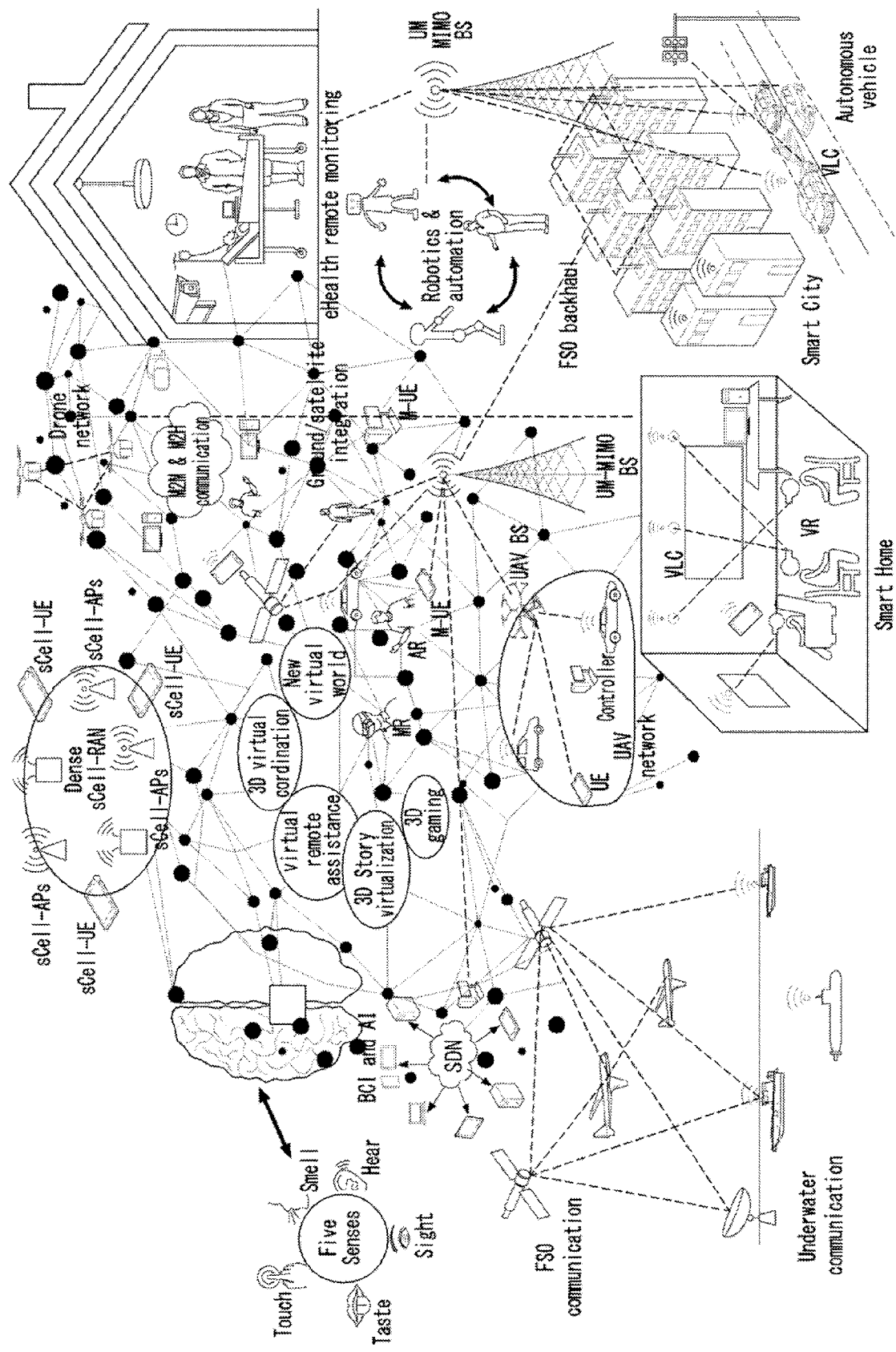
FIG. 15 is a view showing an example of a communication structure providable in a 6G system applicable to the present disclosure.

FIG. 15 is a view showing an example of a communication structure providable in a 6G system applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-TH communication with wide bandwidth and applying advanced massive MIMO technology.

Figure 16:
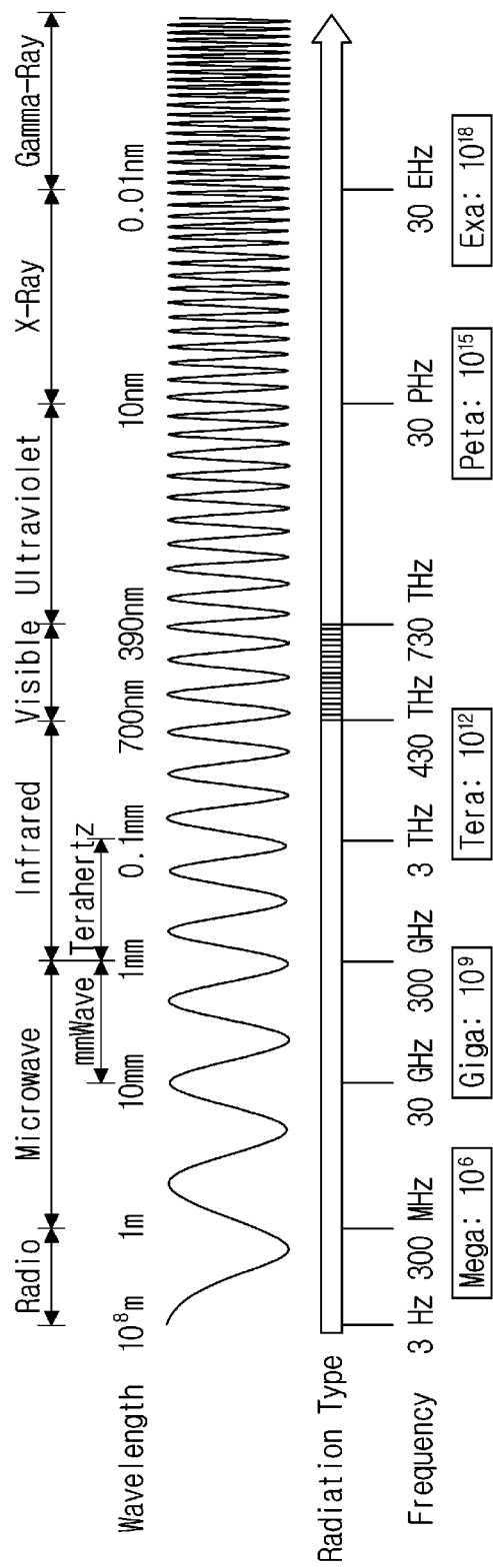
FIG. 16 is a view showing an electromagnetic spectrum applicable to the present disclosure.

FIG. 16 is a view showing an electromagnetic spectrum applicable to the present disclosure. For example, referring to FIG. 16, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

THz Wireless Communication

Figure 17:
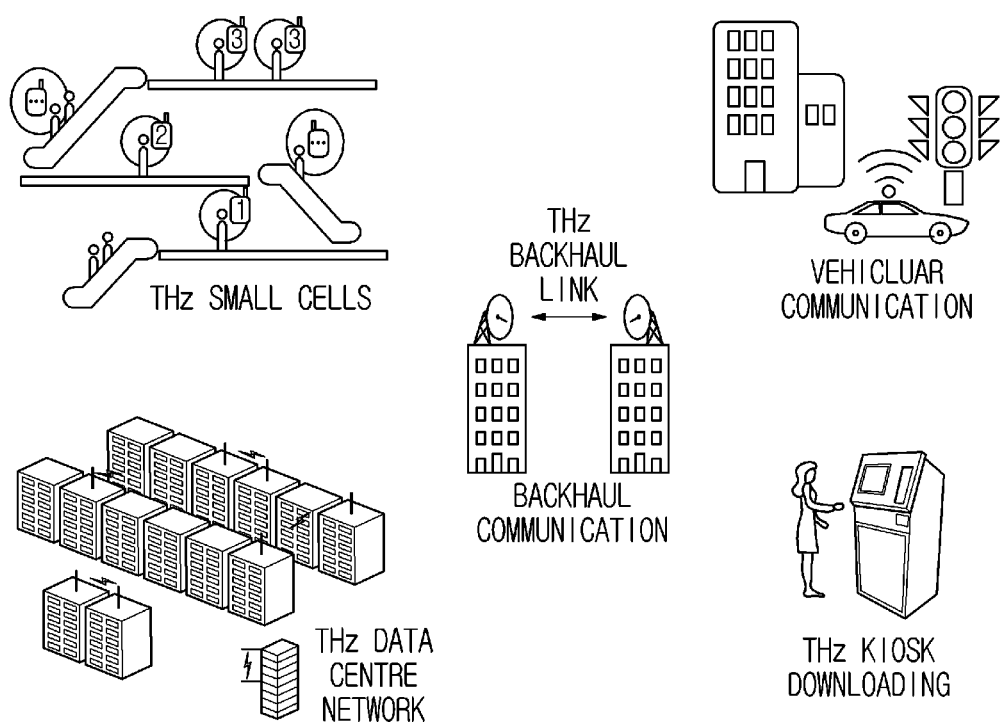
FIG. 17 is a view showing a THz communication method applicable to the present disclosure.

FIG. 17 is a view showing a THz communication method applicable to the present disclosure.

Referring to FIG. 17, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Specifically, referring to FIG. 17, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multipoint connection such as wireless connection in a data center or kiosk downloading. Table 5 below shows an example of technology which may be used in the THz wave.

TABLE 5

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 18:
FIG. 18 is a view showing a THz wireless communication transceiver applicable to the present disclosure.

FIG. 18 is a view showing a THz wireless communication transceiver applicable to the present disclosure.

Referring to FIG. 18, THz wireless communication may be classified based on the method of generating and receiving THz. The THz generation method may be classified as an optical device or electronic device based technology.

At this time, the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

Figure 19:
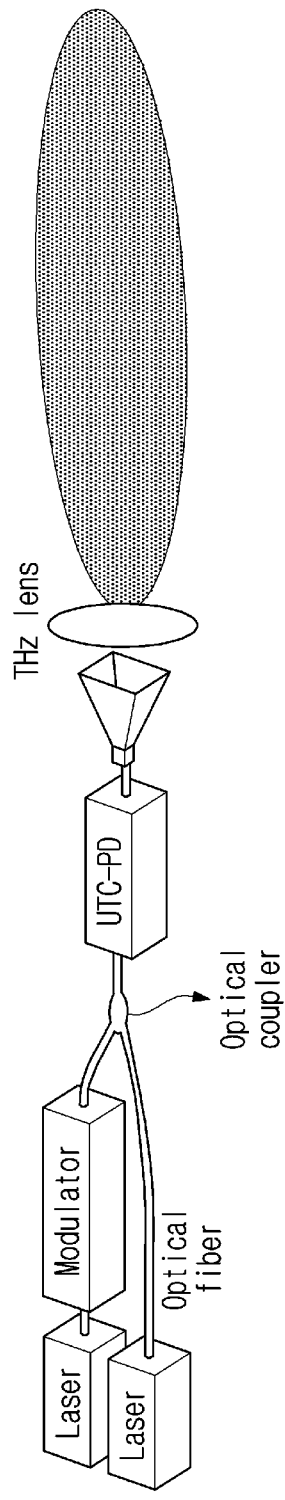
FIG. 19 is a view showing a THz signal generation method applicable to the present disclosure.
Figure 20:
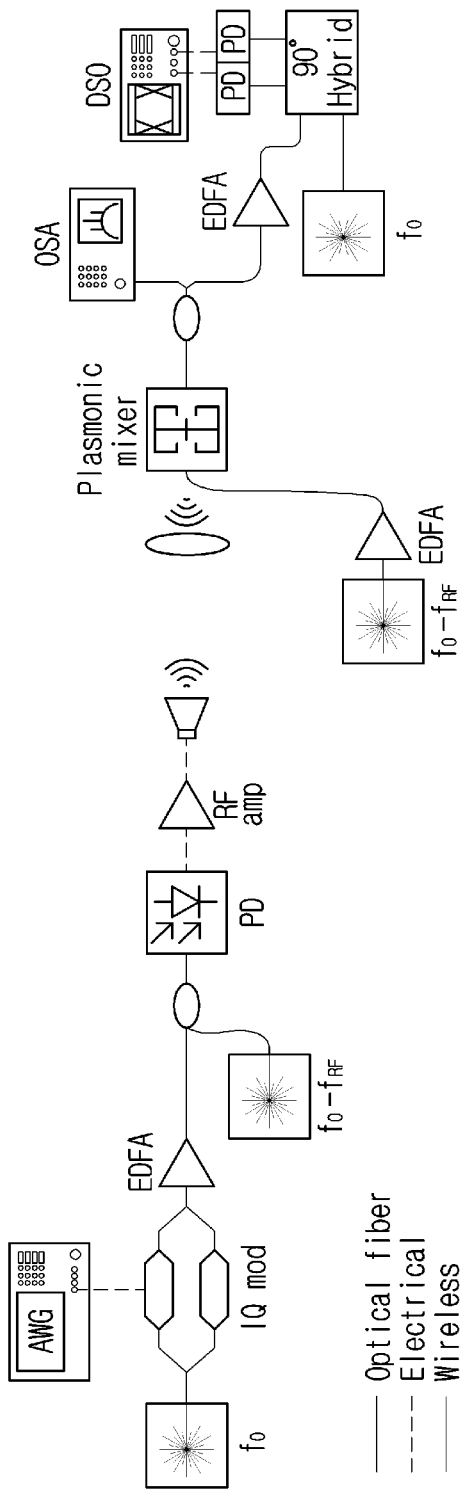
FIG. 20 is a view showing a wireless communication transceiver applicable to the present disclosure.

FIG. 19 is a view showing a THz signal generation method applicable to the present disclosure. FIG. 20 is a view showing a wireless communication transceiver applicable to the present disclosure.

Referring to FIGS. 19 and 20, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 19, a laser diode, a broadband optical modulator, and an ultrahigh-speed photodetector are required. In the case of FIG. 19, the light signals of two lasers having different wavelengths are combined to generate a THz signal corresponding to a wavelength difference between the lasers. In FIG. 19, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 20, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 21:
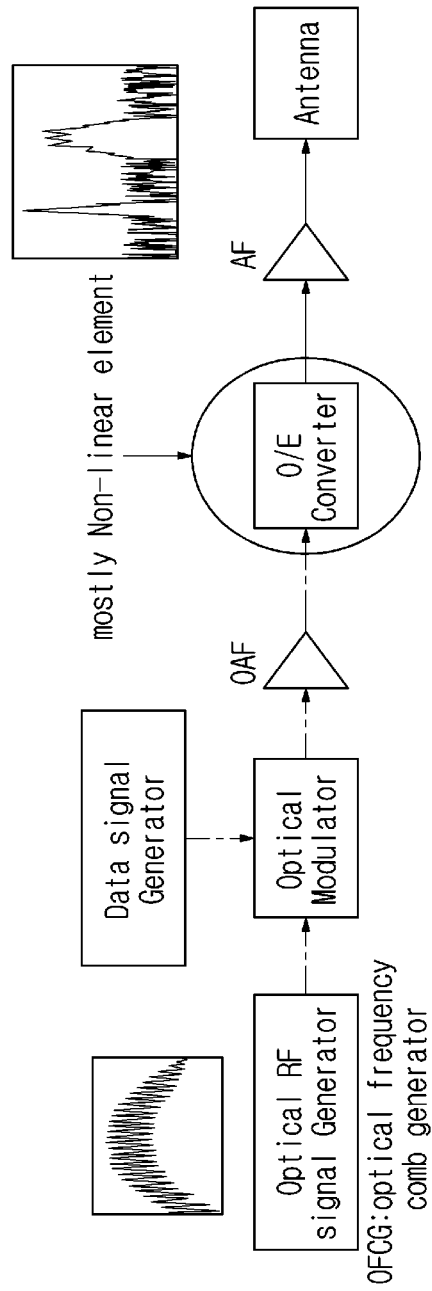
FIG. 21 is a view showing a transmitter structure applicable to the present disclosure.
Figure 22:
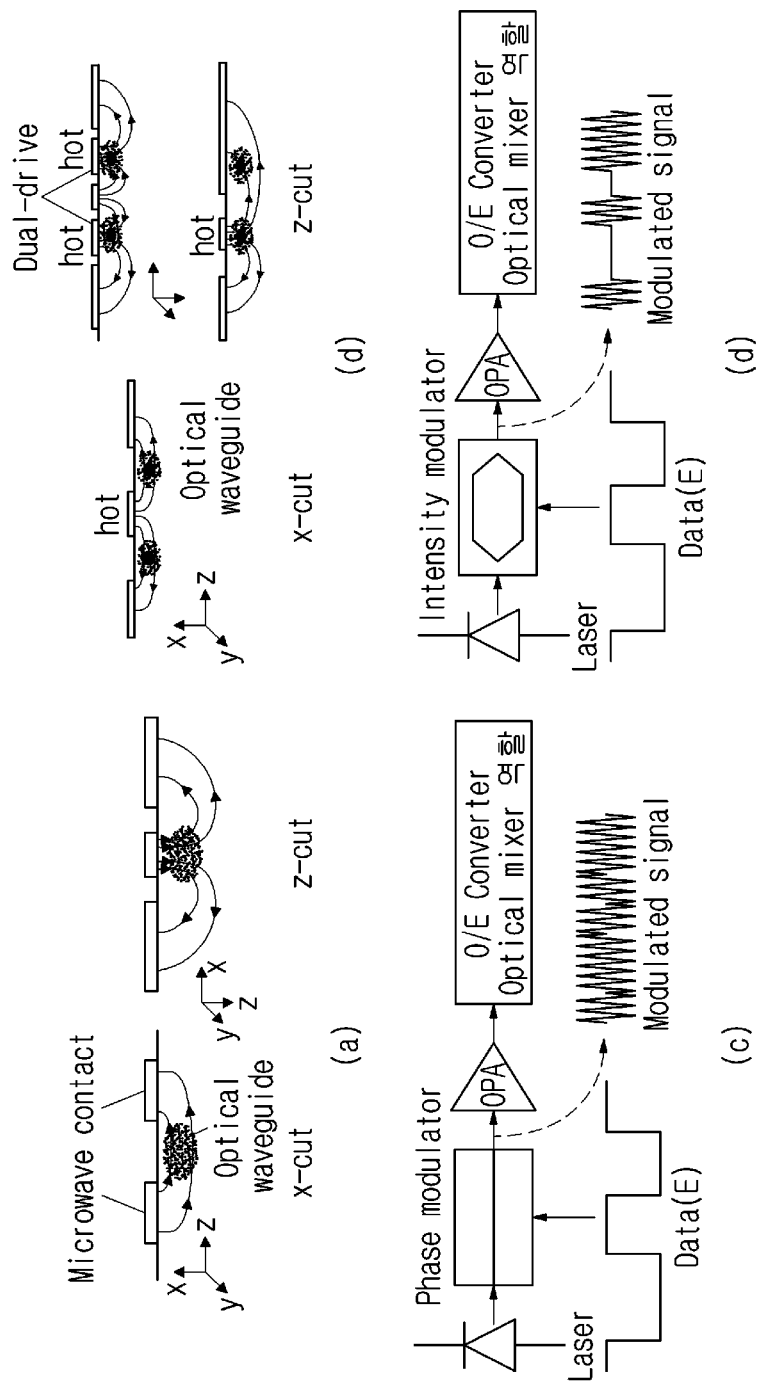
FIG. 22 is a view showing a modulator structure applicable to the present disclosure.

FIG. 21 is a view showing a transmitter structure applicable to the present disclosure. FIG. 22 is a view showing a modulator structure applicable to the present disclosure.

Referring to FIGS. 21 and 22, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Artificial Intelligence System

Figure 23:
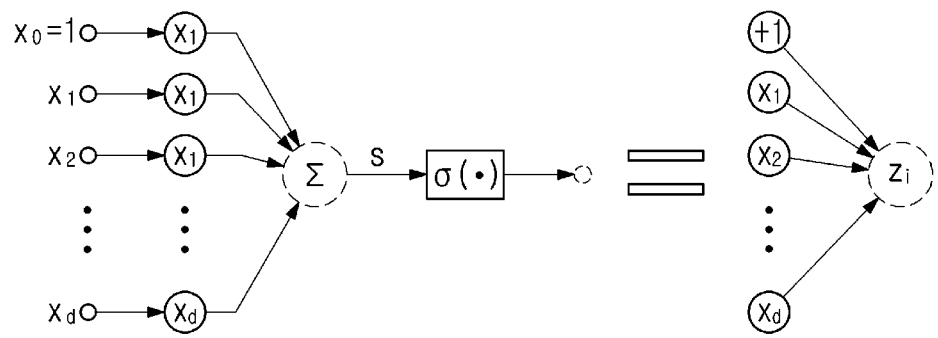
FIG. 23 is a view showing a perceptron architecture in an artificial neural network applicable to the present disclosure.
Figure 24:
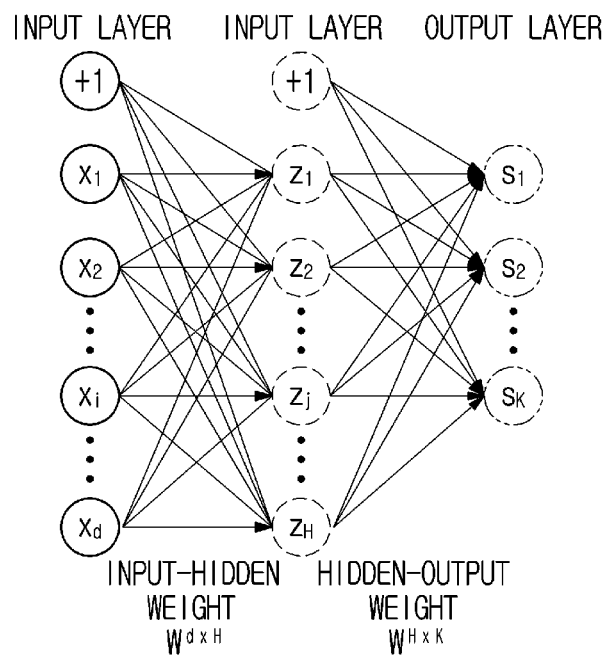
FIG. 24 is a view showing an artificial neural network architecture applicable to the present disclosure.

FIG. 23 is a view showing a perceptron architecture in an artificial neural network applicable to the present disclosure. In addition, FIG. 24 is a view showing an artificial neural network architecture applicable to the present disclosure.

As described above, an artificial intelligence system may be applied to a 6G system. Herein, as an example, the artificial intelligence system may operate based on a learning model corresponding to the human brain, as described above. Herein, a paradigm of machine learning, which uses a neural network architecture with high complexity like artificial neural network, may be referred to as deep learning. In addition, neural network cores, which are used as a learning scheme, are mainly a deep neural network (DNN), a convolutional deep neural network (CNN), and a recurrent neural network (RNN). Herein, as an example referring to FIG. 23, an artificial neural network may consist of a plurality of perceptrons. Herein, when an input vector $x=\{x_1, x_2, \ldots, x_d\}$ is input, each component is multiplied by a weight $\{W_1, W_2, \ldots, W_d\}$, results are all added up, and then an activation function $\sigma(\ )$ is applied, of which the overall process may be referred to as a perceptron. For a large artificial neural network architecture, when expanding the simplified perceptron structure illustrated in FIG. 23, an input may be applied to different multidimensional perceptrons. For convenience of explanation, an input value or an output value will be referred to as a node.

Meanwhile, the perceptron structure illustrated in FIG. 23 may be described to consist of a total of 3 layers based on an input value and an output value. An artificial neural network, which has H (d+1)-dimensional perceptrons between a 1st layer and a 2nd layer and K (H+1)-dimensional perceptrons between the 2nd layer and a 3rd layer, may be expressed as in FIG. 24.

Herein, a layer, in which an input vector is located, is referred to as an input layer, a layer, in which a final output value is located, is referred to as an output layer, and all the layers between the input layer and the output layer are referred to as hidden layers. As an example, 3 layers are disclosed in FIG. 24, but since an input layer is excluding in counting the number of actual artificial neural network layers, it can be understood that the artificial neural network illustrated in FIG. 23 has a total of 2 layers. An artificial neural network is constructed by connecting perceptrons of a basic block two-dimensionally.

The above-described input layer, hidden layer and output layer are commonly applicable not only to multilayer perceptrons but also to various artificial neural network architectures like CNN and RNN, which will be described below. As there are more hidden layers, an artificial neural network becomes deeper, and a machine learning paradigm using a sufficiently deep artificial neural network as a learning model may be referred to as deep learning. In addition, an artificial neural network used for deep learning may be referred to as a deep neural network (DNN).

Figure 25:
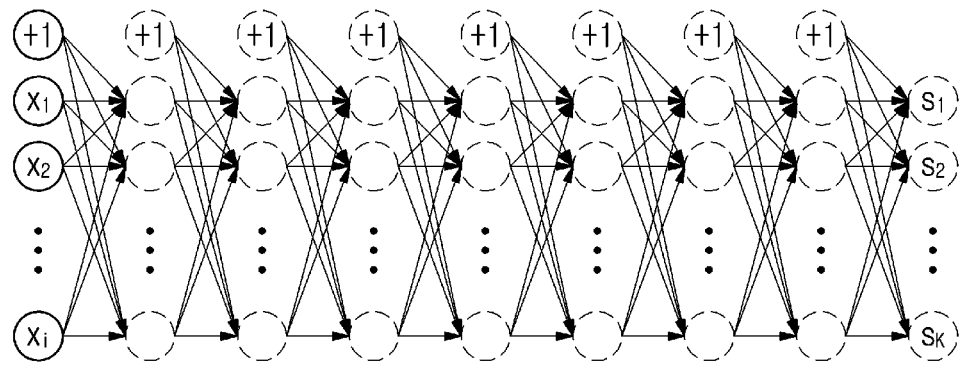
FIG. 25 is a view showing a deep neural network applicable to the present disclosure.

FIG. 25 is a view showing a deep neural network applicable to the present disclosure.

Referring to FIG. 25, a deep neural network may be a multilayer perceptron consisting of 8 layers (hidden layers+output layer). Herein, the multilayer perceptron structure may be expressed as a fully-connected neural network. In a fully-connected neural network, there may be no connection between nodes in a same layer and only nodes located in neighboring layers may be connected with each other. A DNN has a fully-connected neural network structure combining a plurality of hidden layers and activation functions so that it may be effectively applied for identifying a correlation characteristic between an input and an output. Herein, the correlation characteristic may mean a joint probability between the input and the output.

Figure 26:
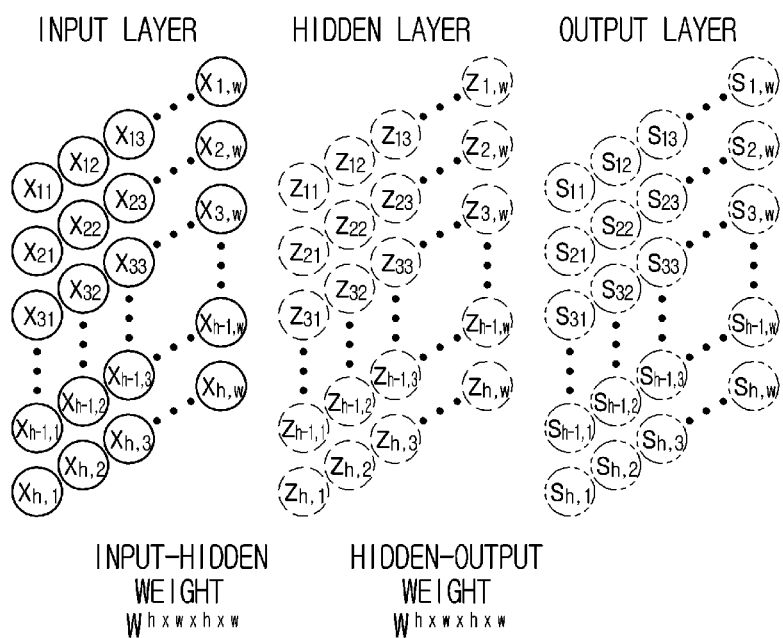
FIG. 26 is a view showing a convolutional neural network applicable to the present disclosure.
Figure 27:
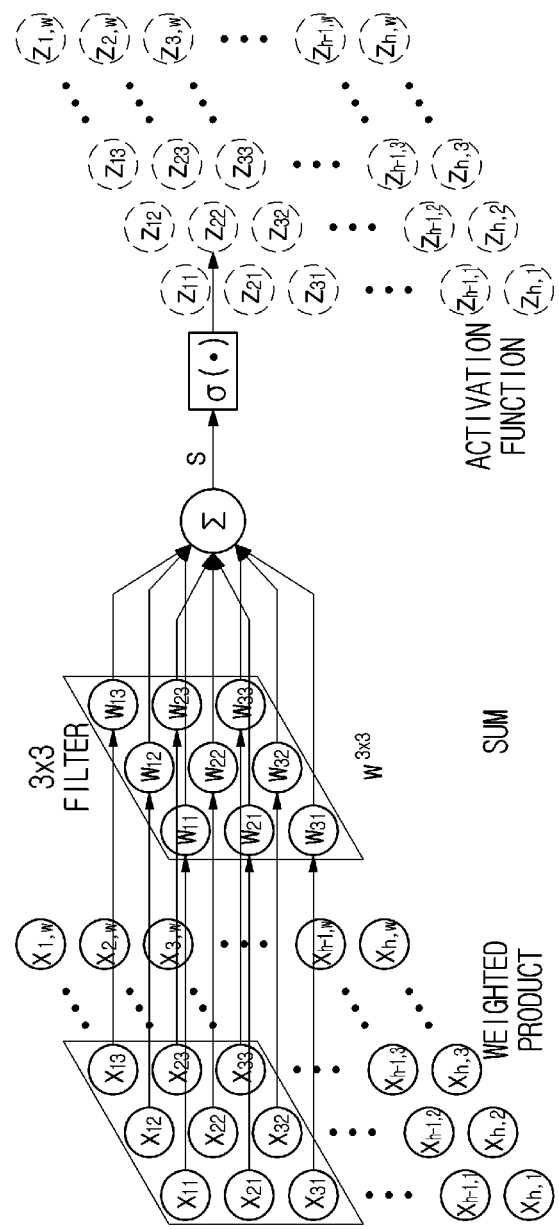
FIG. 27 is a view showing a filter operation of a convolutional neural network applicable to the present disclosure.

FIG. 26 is a view showing a convolutional neural network applicable to the present disclosure. In addition, FIG. 27 is a view showing a filter operation of a convolutional neural network applicable to the present disclosure.

As an example, depending on how to connect a plurality of perceptrons, it is possible to form various artificial neural network structures different from the above-described DNN. Herein, in the DNN, nodes located in a single layer are arranged in a one-dimensional vertical direction. However, referring to FIG. 26, it is possible to assume a two-dimensional array of w horizontal nodes and h vertical nodes (the convolutional neural network structures of FIG. 26). In this case, since a weight is applied to each connection in a process of connecting one input node to a hidden layer, a total of h×w weights should be considered. As there are h×w nodes in an input layer, a total of $h^2 w^2$ weights may be needed between two neighboring layers.

Furthermore, as the convolutional neural network of FIG. 26 has the problem of exponential increase in the number of weights according to the number of connections, the presence of a small filter may be assumed instead of considering every mode of connections between neighboring layers. As an example, as shown in FIG. 27, weighted summation and activation function operation may be enabled for a portion overlapped by a filter.

At this time, one filter has a weight corresponding to a number as large as its size, and learning of a weight may be performed to extract and output a specific feature on an image as a factor. In FIG. 27, a 3×3 filter may be applied to a top rightmost 3×3 area of an input layer, and an output value, which is a result of the weighted summation and activation function operation for a corresponding node, may be stored at $z_{22}$.

Herein, as the above-described filter scans the input layer while moving at a predetermined interval horizontally and vertically, a corresponding output value may be put a position of a current filter. Since a computation method is similar to a convolution computation for an image in the field of computer vision, such a structure of deep neural network may be referred to as a convolutional neural network (CNN), and a hidden layer created as a result of convolution computation may be referred to as a convolutional layer. In addition, a neural network with a plurality of convolutional layers may be referred to as a deep convolutional neural network (DCNN).

In addition, at a node in which a current filter is located in a convolutional layer, a weighted sum is calculated by including only a node in an area covered by the filter and thus the number of weights may be reduced. Accordingly, one filter may be so used as to focus on a feature of a local area. Thus, a CNN may be effectively applied to image data processing for which a physical distance in a two-dimensional area is a crucial criterion of determination. Meanwhile, a CNN may apply a plurality of filters immediately before a convolutional layer and create a plurality of output results through a convolution computation of each filter.

Meanwhile, depending on data properties, there may be data of which a sequence feature is important. A recurrent neural network structure may be a structure obtained by applying a scheme, in which elements in a data sequence are input one by one at each timestep by considering the distance variability and order of such sequence datasets and an output vector (hidden vector) output at a specific timestep is input with a very next element in the sequence, to an artificial neural network.

Figure 28:
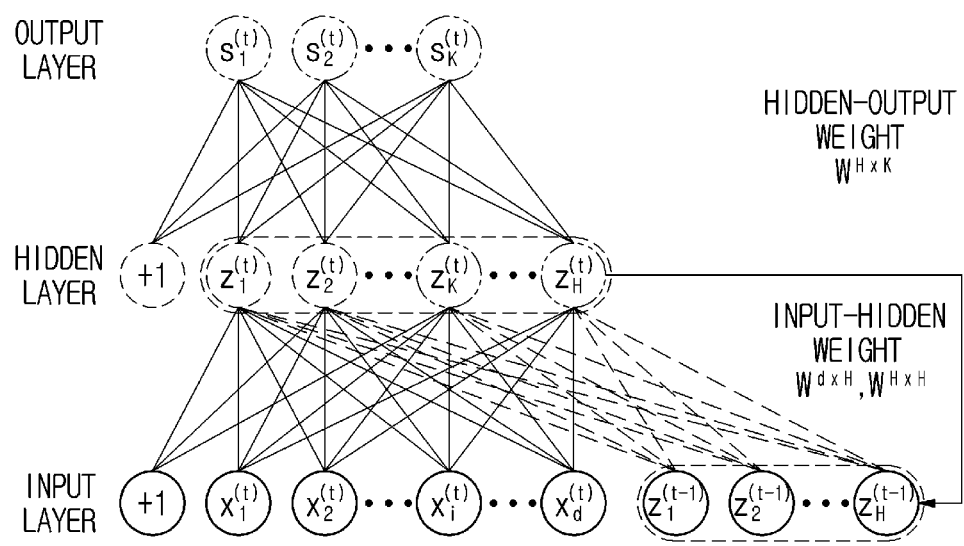
FIG. 28 is a view showing a neural network architecture with a recurrent loop applicable to the present disclosure.
Figure 29:
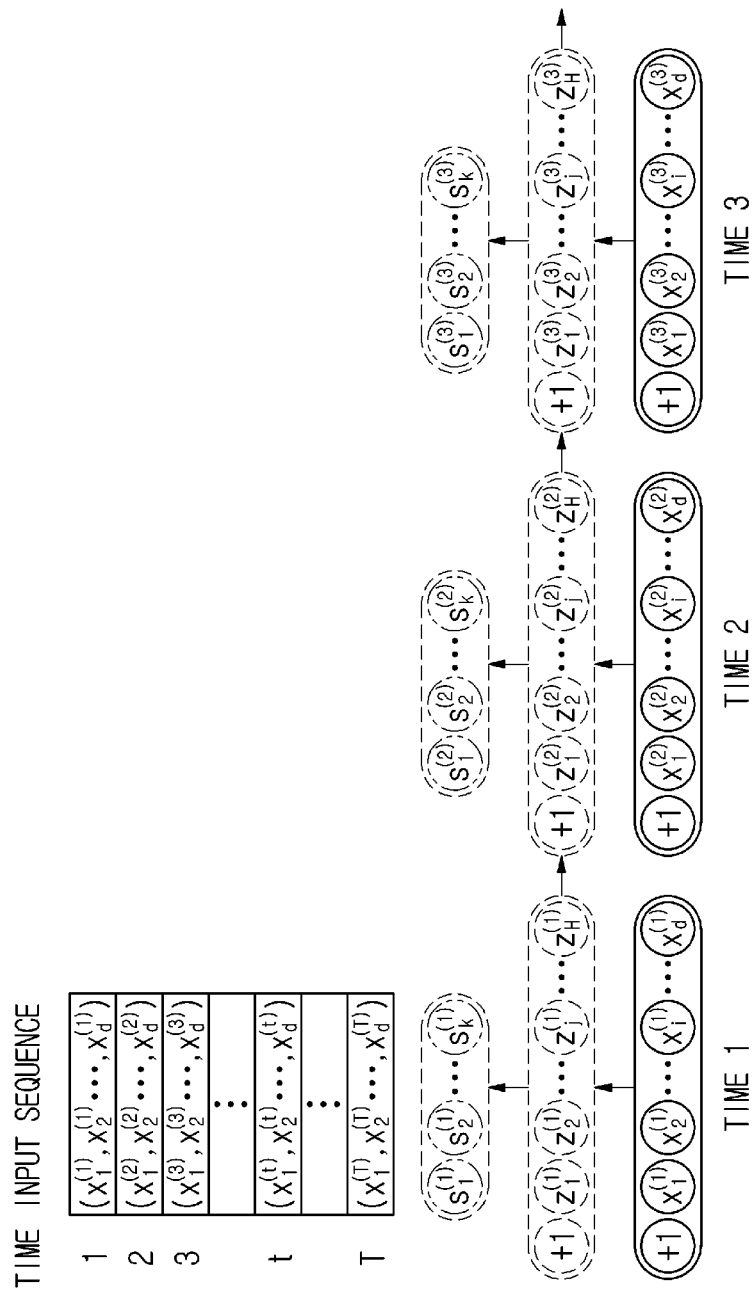
FIG. 29 is a view showing an operational structure of a recurrent neural network applicable to the present disclosure.

FIG. 28 is a view showing a neural network architecture with a recurrent loop applicable to the present disclosure. FIG. 29 is a view showing an operational structure of a recurrent neural network applicable to the present disclosure.

Referring to FIG. 28, a recurrent neural network (RNN) may have a structure which applies a weighted sum and an activation function by inputting hidden vectors $\{z_1^{(t-1)}, z_2^{(t-1)}, \ldots, z_H^{(t-1)}\}$ of an immediately previous timestep t−1 during a process of inputting elements $\{x_1^{(t)}, x_2^{(t)}, \ldots, x_d^{(t)}\}$ of a timestep t in a data sequence into a fully connected neural network. The reason why such hidden vectors are forwarded to a next timestep is because information in input vectors at previous timesteps is considered to have been accumulated in a hidden vector of a current timestep.

In addition, referring to FIG. 29, a recurrent neural network may operate in a predetermined timestep order for an input data sequence. Herein, as a hidden vector $\{z_1^{(1)}, z_2^{(1)}, \ldots, z_H^{(t-1)}\}$ at a time of inputting an input vector $\{x_1^{(t)}, x_2^{(t)}, \ldots, x_d^{(t)}\}$ of timestep 1 into a recurrent neural network is input together with an input vector $\{x_1^{(2)}, x_2^{(2)}, \ldots, x_d^{(2)}\}$ of timestep 2, a vector $\{z_1^{(2)}, z_2^{(2)}, \ldots, z_H^{(2)}\}$ of a hidden layer is determined through a weighted sum and an activation function. Such a process is iteratively performed at timestep 2, timestep 3 and until timestep T.

Meanwhile, when a plurality of hidden layers are allocated in a recurrent neural network, this is referred to as a deep recurrent neural network (DRNN). A recurrent neural network is so designed as to effectively apply to sequence data (e.g., natural language processing).

Apart from DNN, CNN and RNN, other neural network cores used as a learning scheme include various deep learning techniques like restricted Boltzmann machine (RBM), deep belief networks (DBN) and deep Q-Network, and these may be applied to such areas as computer vision, voice recognition, natural language processing, and voice/signal processing.

Recently, there are attempts to integrate AI with a wireless communication system, but these are concentrated in an application layer and a network layer and, especially in the case of deep learning, in a wireless resource management and allocation filed. Nevertheless, such a study gradually evolves to an MAC layer and a physical layer, and there are attempts to combine deep learning and wireless transmission especially in a physical layer. As for a fundamental signal processing and communication mechanism, AI-based physical layer transmission means application of a signal processing and communication mechanism based on an AI driver, instead of a traditional communication framework. For example, it may include deep learning-based channel coding and decoding, deep learning-based signal estimation and detection, deep learning-based MIMO mechanism, and AI-based resource scheduling and allocation.

Concrete Embodiment of the Present Disclosure

The present disclosure relates to estimating a channel in a wireless communication system and, in particular, describes a technology for supporting learning of a machine learning model for using a channel estimation technology based on machine learning.

A base station may use a machine learning model to estimate a downlink channel of a terminal. Herein, in order to train a machine learning model of the base station, the base station may perform a pre-processing process for uplink signals received from each terminal and use pre-processed data as an input of the machine learning model. Then, the machine learning model outputs downlink channel prediction information of each terminal. However, as a wireless channel is much influenced by a surrounding environment, channels underwent by the base station or terminals are significantly different. Accordingly, a single machine learning model is difficult to apply to many base stations, and in order to optimize a machine learning model to each base station environment, data need to be collected in an actual environment and learning needs to be performed in real time.

However, in the case of an existing communication system, an uplink channel is measured at a base station, and a downlink channel is measured at a terminal and then feedback is given to the base station. At this time, the feedback information measured and transmitted by the terminal is processed into information suitable to the terminal in order to reduce an uplink resource, and very limited information is included accordingly. In addition, since an uplink reference signal (RS) or a pilot and downlink reference signal or a transmission interval of pilot is also different, a transmission time gap occurs between an uplink channel and a downlink channel so that even labeled data necessary for learning are not easy to obtain. Accordingly, the present disclosure proposes a real-time online learning scheme for learning of a machine learning model in a system that applies the machine learning model for estimating a downlink channel.

A next-generation communication system after 5G is expected to demand a higher transmission speed and larger capacity than 5G. In order to satisfy the demand, the next-generation communication system will also utilize the multiple input multiple output (MIMO) technology as core technology. One of the important factors for improving the performance of a MIMO system consists in obtaining accurate channel information. It is already known that, as channel information becomes more accurate, the spectral efficiency of a MIMO system increases.

In the case of an existing wireless communication system, a base station depends on a measurement result received from a terminal in order to obtain more accurate channel information. The terminal measures a downlink reference signal transmitted from the base station and reports a measurement result to the base station. Accordingly, based on the report, the base station may determine a precoding and beamforming method for data to be transmitted to the terminal. In this case, in order to reduce a resource for reporting a result measured by the terminal, the wireless communication system defines a beamformer, that is, a list of codewords available to the terminal in advance, and the terminal selects and notifies an optimal codeword based on channel information which is obtained by measuring a reference signal.

In another way, an uplink signal of a terminal may be utilized. A scheme of using an uplink signal is applicable to a time division duplex system and is based on reciprocity of channels. In the case of a TDD system, since a downlink signal and an uplink signal are sent at a same frequency, both may be treated to undergo a same channel environment. That is, channel information estimation from an uplink signal may be utilized to estimate a downlink channel. As an uplink signal of a terminal is used, overhead for the terminal to give feedback on channel information is reduced. Nevertheless, it is difficult to utilize as it is since radio frequency (RF) chain features are different between an uplink and a downlink of a terminal.

Recently, techniques of using machine learning are being studied with a view to estimating a downlink channel from an uplink channel. Most studies perform learning based on a result measured in a specific place or a simulation result, estimate a downlink channel from an uplink channel by means of a learned model and show estimation results with high accuracy. However, in the case of a real system, base stations have various channel environments, and it is also desirable to consider a RF chain feature for each terminal. Accordingly, a machine learning model, which has been trained using a measurement result in a specific area or a simulation result, cannot be smoothly applied to a real communication environment. That is, each base station requires a process of training and optimizing a machine learning model in real time according to each channel environment.

Figure 30:
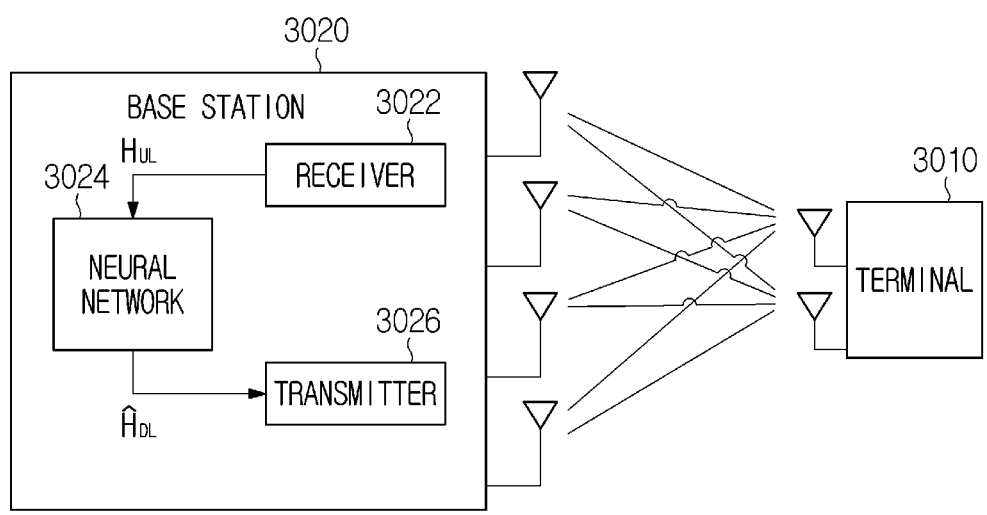
FIG. 30 is a view showing a concept of a system that performs channel estimation based on machine learning applicable to the present disclosure.

A system for estimating a downlink channel from an uplink signal through machine learning at a base station may be schematically expressed as in FIG. 30 below. FIG. 30 is a view showing a concept of a system that performs channel estimation based on machine learning applicable to the present disclosure.

Referring to FIG. 30, a MIMO channel is formed between a terminal 3010 and a base station 3020. FIG. 30 illustrates that the terminal 3010 has 2 antennas and the base station 3020 has 4 antennas, but the terminal 3010 and the base station 3020 may have a different number of antennas respectively.

The terminal 3010 transmits an uplink reference signal to the base station 3020. The base station 3020 receives the uplink reference signal using a receiver 3022 and determines uplink channel information $H_{UL}$ from the received uplink reference signal. The calculated uplink channel information $H_{UL}$ is used as an input of a neural network (NN) 3024. The neural network 3024 of the base station 3020 determines a downlink channel estimate $\hat{H}_{DL}$. A transmitter 3026 of the base station 3020 calculates an optimal precoding and beamforming parameter for the terminal 3010 based on an output of the neural network 3024 and transmits downlink data by using precoding and beamforming.

Figure 31:
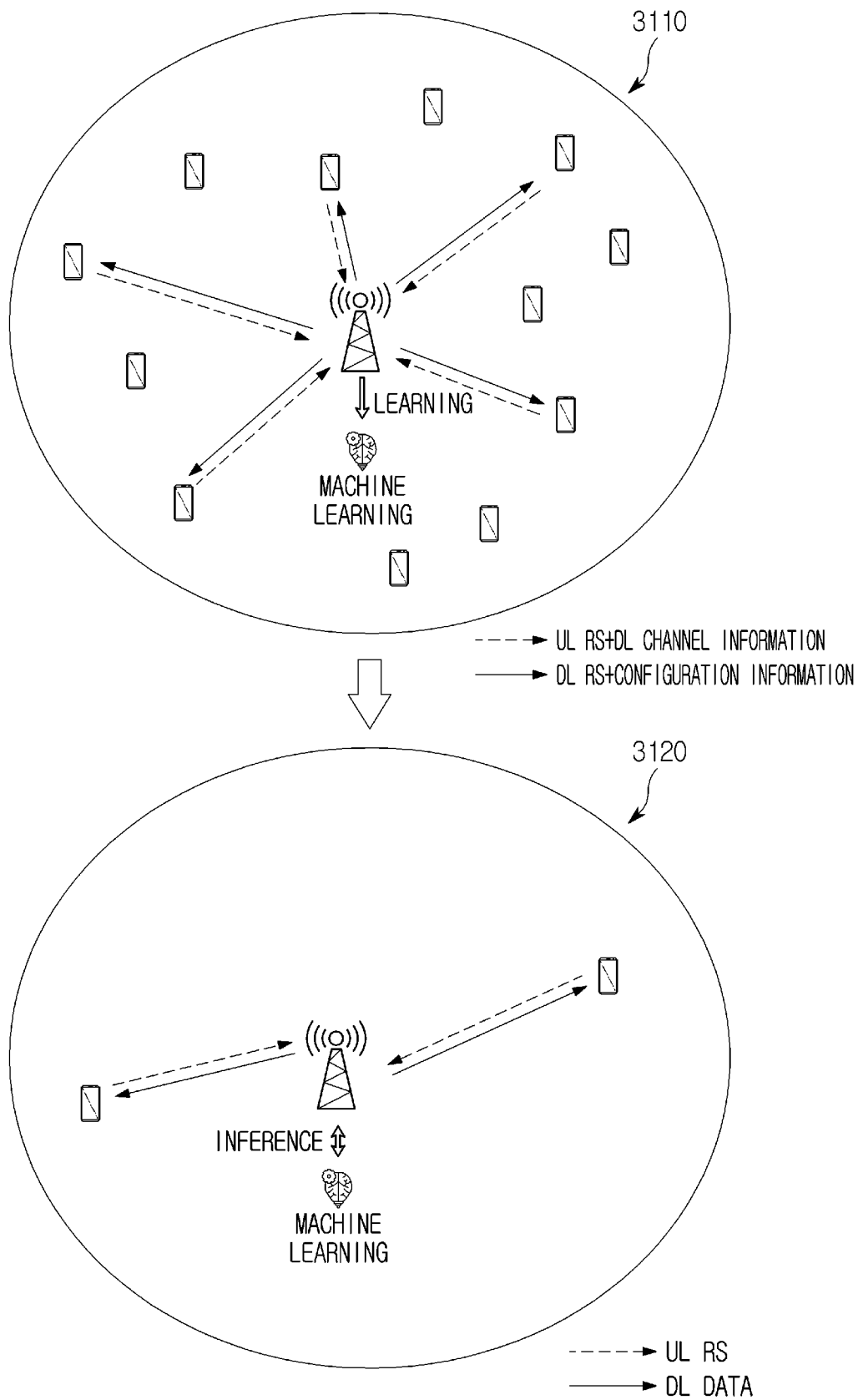
FIG. 31 is a view showing learning and inference for a machine learning model applicable to the present disclosure.

FIG. 31 is a view showing learning and inference for a machine learning model applicable to the present disclosure. In FIG. 31, a first situation 3110 is a state of training a machine learning model, and a second situation 3120 is a state of estimating a channel through inference using the trained machine learning model.

Referring to FIG. 31, in the first situation 3110, a base station selects several terminals within coverage of the base station for machine learning model training. In addition, the base station transmits configuration information including information necessary for learning to the selected terminals. After transmitting the configuration information, the base station transits a downlink reference signal. When collection of specific learning data is requested from the base station, the terminals measure and report a downlink reference signal by using the configuration information. At the same time, according to the configuration information, the terminals transmit an uplink reference signal at a corresponding timestep. In order to prevent a channel change due to significant difference between a transmission timestep of an uplink reference signal and a transmission timestep of a downlink reference signal, the base station may allocate a resource so that a timestep for a terminal to transmit an uplink reference signal and a timestep for the base station to transmit a downlink reference signal are within a channel coherence time. After storing information on uplink reference signals and downlink channels, which is received from terminals for a predetermine period, the base station trains a machine learning mode by using the stored data. In case a learning result of the machine learning model does not reach a satisfactory level, the base station iterates the above-described operations.

In the second situation, the base station applies a completed learned model for estimating actual downlink channel information. The base station utilizes the estimated downlink information for a precoder selection and beamforming operation necessary for downlink data transmission.

Figure 32:
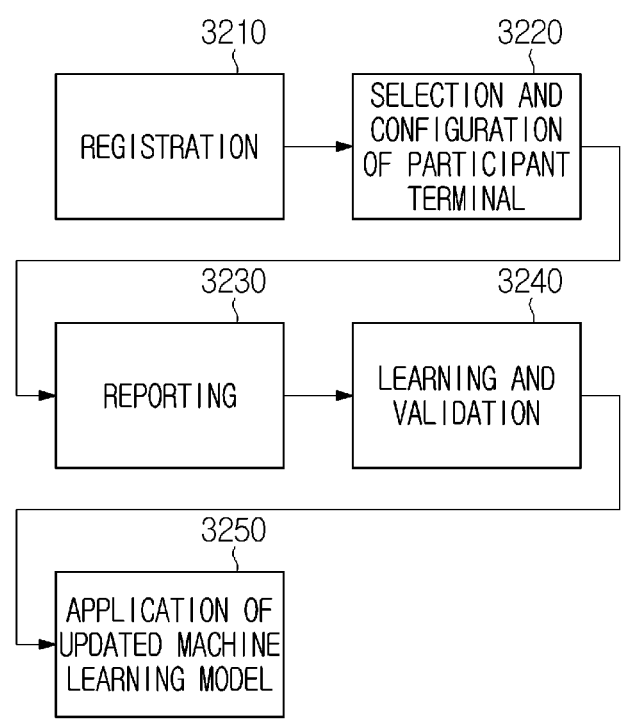
FIG. 32 is a view showing a learning procedure of a machine learning model applicable to the present disclosure.

FIG. 32 is a view showing a learning procedure of a machine learning model applicable to the present disclosure.

Referring to FIG. 32, learning of a machine learning model according to various embodiments includes a registration procedure 3210, a participant terminal selection and configuration procedure 3220, a reporting procedure 3230, a learning and validation procedure 3240, and an updated machine learning model application procedure 3250.

The registration procedure 3210 is a procedure of managing a pool of terminals capable of supporting learning of a machine learning model. The participant terminal selection and configuration procedure 3220 is a procedure of selecting a terminal, which will perform measurement and reporting, and of providing necessary configuration information. The reporting procedure 3230 is a procedure of providing information measured by a terminal to a base station. The learning and validation procedure 3240 is a procedure of training a machine learning model by using collected information. The updated machine learning model application procedure 3250 is a procedure of estimating and utilizing a channel by means of a trained machine learning model. Each procedure will be described in further detail below.

Figure 33:
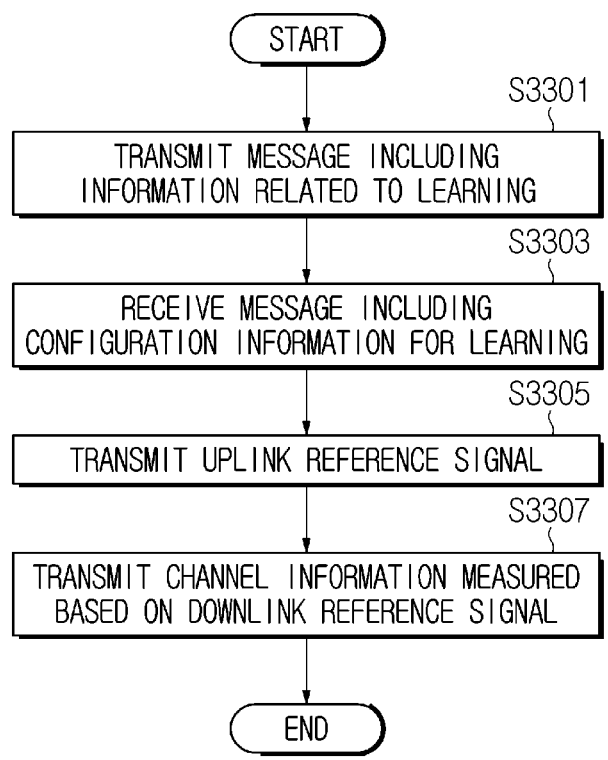
FIG. 33 is a view showing an embodiment of a procedure for supporting learning in a terminal applicable to the present disclosure.

FIG. 33 is a view showing an embodiment of a procedure for supporting learning in a terminal applicable to the present disclosure. FIG. 33 illustrates an operating method of a terminal.

Referring to FIG. 33, at step S3301, a terminal transmits a message including information related to learning. For example, the information related to learning may include at least one of information related to learning support capability of the terminal (e.g., information indicating the presence or absence of capability, information indicating a level of capability), information notifying a learning-related state, and information requesting a change of a learning-related state. According to an embodiment, a plurality of messages including different types of information may be transmitted.

At step S3303, the terminal receives a message including configuration information for learning. The configuration information may be received when whether or not to participate in learning is determined. The configuration information may include at least one of information related to progress of learning (e.g., a learning start timestep, a learning end timestep, learning duration, timer), information indicating a resource for a downlink reference signal (e.g., a resource location, a value of signal), and information for reporting a measurement result of a downlink channel (e.g., a resource location, a reporting scheme, a measurement target, a reporting target, a format of information). Then, the configuration information is used to transmit or receive a signal and information.

At step S3305, the terminal transmits an uplink reference signal. The terminal transmits an uplink reference signal through a resource indicated by the configuration information. Herein, a value of the uplink reference signal may be predefined, determined based on another parameter, or allocated by the configuration information.

At step S3307, the terminal transmits channel information measured based on a downlink reference signal. That is, the terminal obtains downlink channel information by receiving the downlink reference signal through a resource indicated by the configuration information and performing measurement for the received downlink reference signal. In addition, the terminal transmits the downlink channel information through the resource indicated by the configuration information. Herein, a value of the downlink reference signal may be predefined, determined based on another parameter, or allocated by the configuration information.

Although not shown in FIG. 33, the uplink reference signal and the measured channel information, which are transmitted by the terminal, are received by a base station and are used for learning at the base station. In addition, a learned machine learning model may be used to estimate a downlink channel at the base station.

Figure 34:
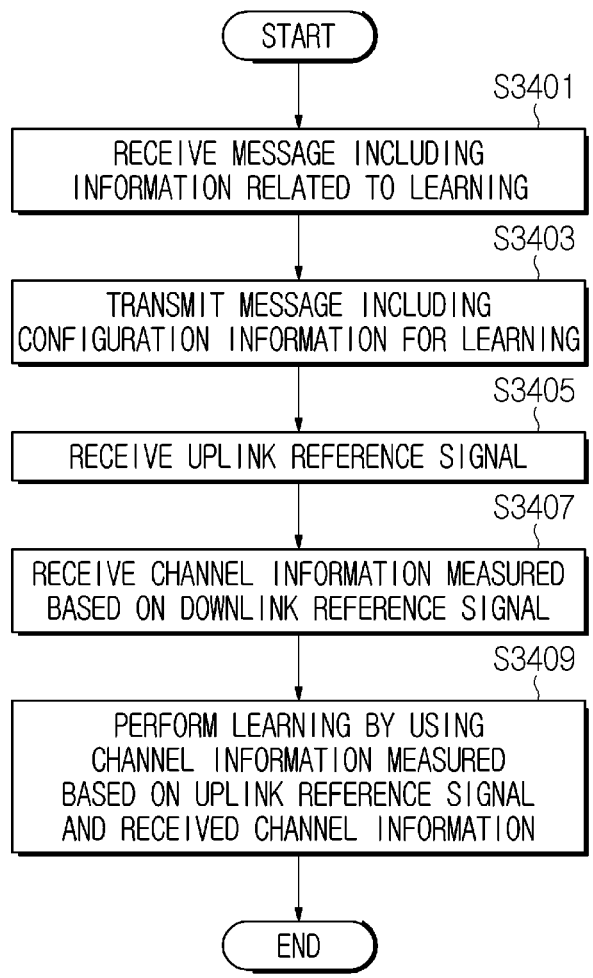
FIG. 34 is a view showing an embodiment of a procedure for performing learning in a base station applicable to the present disclosure.

FIG. 34 is a view showing an embodiment of a procedure for performing learning in a base station applicable to the present disclosure. FIG. 34 illustrates an operating method of a base station.

Referring to FIG. 34, at step S3401, the base station receives a message including information related to learning. For example, the information related to learning may include at least one of information related to learning support capability of the terminal (e.g., information indicating the presence or absence of capability, information indicating a level of capability), information notifying a learning-related state, and information requesting a change of a learning-related state. According to an embodiment, a plurality of messages including different types of information may be received.

At step S3403, the base station transmits a message including configuration information for learning. The configuration information may be transmitted to a terminal that is determined to participate in learning. The configuration information may include at least one of information related to progress of learning (e.g., a learning start timestep, a learning end timestep, learning duration, timer), information indicating a resource for a downlink reference signal (e.g., a resource location, a value of signal), and information for reporting a measurement result of a downlink channel (e.g., a resource location, a reporting scheme, a measurement target, a reporting target, a format of information). Then, the configuration information is used to transmit or receive a signal and information.

At step S3405, the base station receives an uplink reference signal. The base station may detect the uplink reference signal via a resource indicated through the configuration information. Herein, a value of the uplink reference signal may be predefined, determined based on another parameter, or allocated by the configuration information.

At step S3407, the base station receives channel information measured based on a downlink reference signal. The base station transmits the downlink reference signal through a resource indicated by the configuration information and obtains downlink channel information from a terminal that receives the downlink reference signal. Herein, a value of the downlink reference signal may be predefined, determined based on another parameter, or allocated by the configuration information.

At step S3409, the base station performs learning by using channel information, which is measured based on the uplink reference signal, and the received channel information. That is, the base station may perform measurement for the uplink reference signal received from the terminal and may perform learning by using uplink channel information, which is obtained through the measurement, and downlink channel information received from the terminal.

According to the embodiments described with reference to FIG. 33 and FIG. 34, a machine learning model may be learned. The learned machine learning model may be used to estimate a downlink channel at the base station. At least a part of a learning support procedure and a learning procedure according to the above-described embodiments may be iteratively performed as needed. A learning procedure of a machine learning model considering iteration is illustrated in FIG. 35 below.

Figure 35:
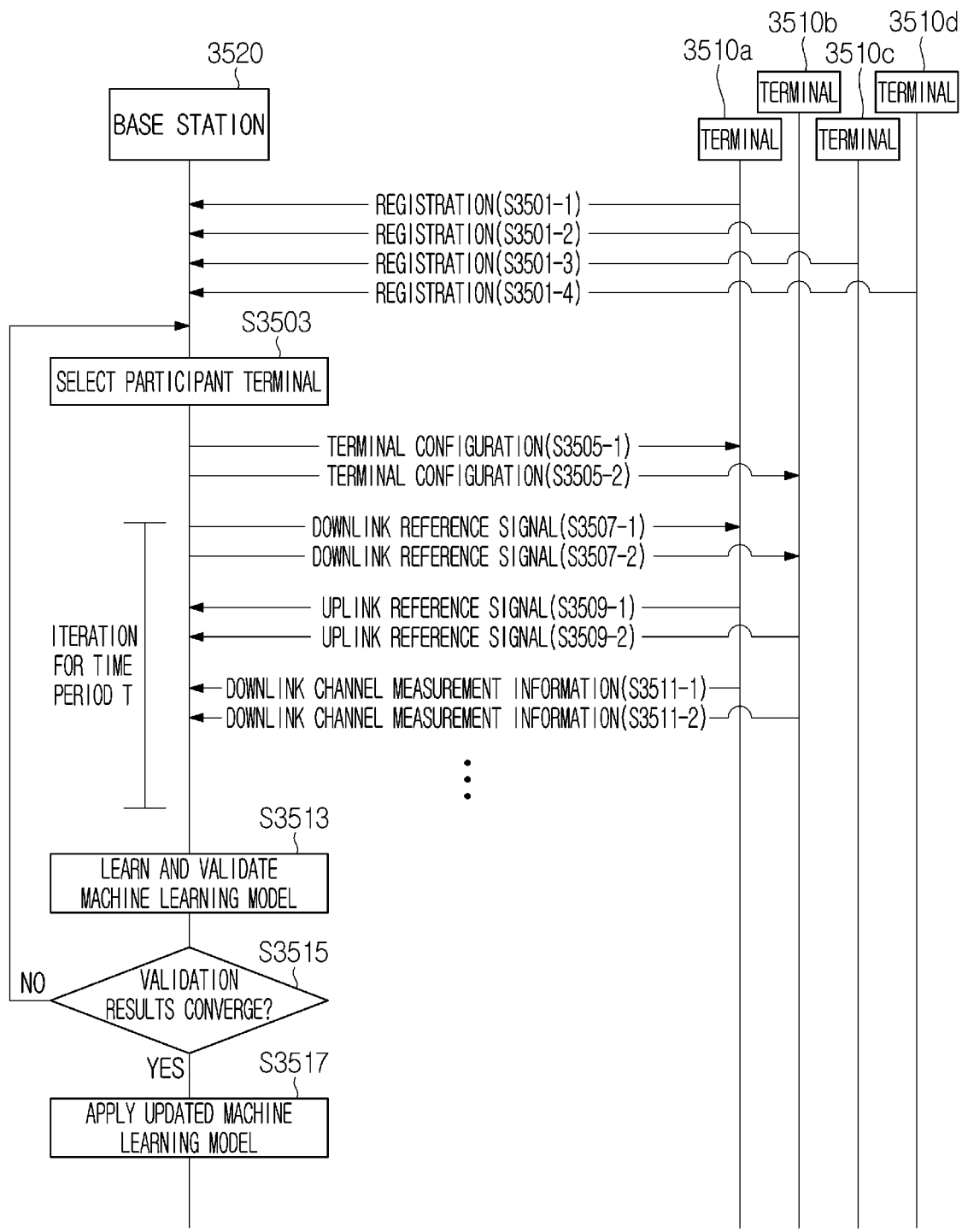
FIG. 35 is a view showing an embodiment of signal exchange for performing learning applicable to the present disclosure.

FIG. 35 is a view showing an embodiment of signal exchange for performing learning applicable to the present disclosure. FIG. 35 illustrates exchange of messages and signals between terminals 3510a to 3510d and a base station 3520.

Referring to FIG. 35, at steps S3501-1 to S3501-4, each of the terminals 3510a to 3510d transmits a registration message to the base station 3520. The registration message includes information necessary for the base station 3520 to support learning, that is, to select a terminal that will participate in learning. For example, the registration message may include at least one of information indicating that learning will be supported, information indicating an operating mode of a terminal related to learning, and information on the terminal. FIG. 35 illustrates that all the terminals 3510a to 3510d transmit the registration message, but at least some of the terminals 3510a to 3510d may transmit a release message according to another embodiment.

At step S3503, the base station 3520 selects at least one terminal that will participate in learning. Herein, the base station 3520 may first determine whether or not to perform learning or whether or not learning is necessary. When it is determined that learning is to be performed, the base station 3520 selects at least one terminal. In the example of FIG. 35, the first terminal 3510a and the second terminal 3510b are selected.

At steps S3505-1 and S3505-2, the base station 3520 transmits terminal configuration information to the first terminal 3510a and the second terminal 3510b respectively. The terminal configuration information may include at least one of resource allocation information for reference signals that will be transmitted later and resource allocation information for transmitting channel measurement information. A value of at least one of parameters included in the terminal configuration information may be different according to terminals. Herein, the resource allocation information for reference signals includes resource allocation information for a downlink reference signal and resource allocation information for an uplink reference signal. According to an embodiment, one of the resource allocation information for a downlink reference signal and the resource allocation information for an uplink reference signal may be derived by a rule that is predefined by the other one. In this case, it may be understood that the resource allocation information derived by the rule is not explicitly included in the terminal configuration information but implicitly follows signaling.

At steps S3507-1 and S3507-2, the base station 3520 transmits downlink reference signals to the first terminal 3510a and the second terminal 3510b. FIG. 35 illustrates that a downlink reference signal transmitted to the first terminal 3510a and a downlink reference signal transmitted to the second terminal 3510b are separate signals. In this case, the downlink reference signals transmitted to the first terminal 3510a and the second terminal 3510b may be multiplexed at a same time-frequency resource or be transmitted at different time-frequency resources. However, according to another embodiment, a downlink reference signal transmitted to the first terminal 3510a and a downlink reference signal transmitted to the second terminal 3510b may be a same signal.

At steps S3509-1 and S3509-2, each of the first terminal 3510a and the second terminal 3510b transmits an uplink reference signal to the base station 3520. An uplink reference signal may be transmitted through a resource indicated by terminal configuration information received from the base station 3520. Herein, an uplink reference signal transmitted by the first terminal 3510a and an uplink reference signal transmitted by the second terminal 3510b may be transmitted at a same time-frequency resource or be transmitted at different time-frequency resources. When being transmitted at the same time-frequency resource, the uplink reference signals may be distinguished by sequence values, and the sequence values may be provided by the terminal configuration information.

At steps S3511-1 and S3511-2, each of the first terminal 3510a and the second terminal 3510b transmits downlink channel measurement information to the base station 3520. The first terminal 3510a and the second terminal 3510b may estimate a downlink channel by using a downlink reference signal and then feed information on the estimated channel back to the base station 3520. The information on the channel may include at least one of an index of a codeword corresponding to a channel matrix and a compressed channel matrix.

At step S3513, the base station 3520 learns and validates a machine learning model. For this, the base station 3520 obtains a training data set and a test data set from a signal or information (e.g., an uplink reference signal and downlink channel measurement information) received from the terminals 3510*a* and 3510*b*. The base station 3520 may perform learning for a machine learning model by using the training data set and verify the performance of the machine learning model by using the test data set. For example, the base station 3520 may perform inference by using the test data set and perform validation by checking how approximate an inference result is to an actual result.

At step S3515, the base station 3520 checks whether or not validation results of the machine learning model converge. For example, by checking whether or not a difference between a result inferred using the test data set and an actual result is below a threshold, the base station 3520 may determine whether or not the performance of the machine learning model converges. In case the performance does not converge, this procedure iterates the steps S3503 to S3515. That is, the steps S3503 and S3515 may be iterated until validation results converge.

When the performance converges, at step S3517, the base station 3520 applies an updated machine learning model. That is, the base station 3520 may estimate a downlink channel by using the updated machine learning model and perform communication based on an estimated downlink channel.

Although not shown in FIG. 35, after the updated machine learning model is applied, learning for the machine learning model may be performed again. A condition for performing learning again may be defined based on various aspects like time, performance, system load and communication environment.

According to an embodiment, learning may be triggered by passage of time. For example, after a predetermined time since last learning, the base station 3520 may perform learning for the machine learning model again by performing the operations of the steps S3503 to S3515 or similar operations.

According to another embodiment, learning may be triggered by deterioration of performance. For example, in case the performance of channel estimation using the machine learning model is deteriorated, the base station 3520 may perform learning for the machine learning model again by performing the operations of the steps S3503 to S3515 or similar operations. Herein, the performance deterioration may be determined by an error rate of data communication based on an inferred downlink channel or be determined by a separate procedure. When the separate procedure is used to determine performance deterioration, the base station 3520 may receive information on a downlink channel, which a terminal estimates periodically or based on an event, and compare an inferred channel and a feedbacked channel. For example, the event may be defined as passage of a predetermined time and error occurrence of data communication at a predetermined level or above.

In FIG. 35, the terminals 3510*a* to 3510*d* transmit a registration message. Before this, when having initial connection to a network, each of the terminals 3510*a* to 3510*d* may transmit a capability information message including information related to learning support capability of a terminal. The information related to learning support capability may be managed as context information of a terminal, and the base station 3520 may obtain the information related to learning support capability of each terminal from a neighboring base station, an upper core network node, or a terminal. In this case, the base station 3520 may manage terminals, which have learning support capability confirmed from capability information, as candidate terminals that can be included in a pool, and include terminals requesting registration among the candidate terminals in the pool.

Hereinafter, the present disclosure will describe each specific procedure of the above-described learning in further detail.

(1) Registration Procedure

In a registration, a base station manages a pool of terminals necessary for learning. The base station may add or delete a terminal in the pool according to a registration request or release request of the terminal. Herein, a terminal having a machine learning function may determine a machine learning model learning mode (e.g., non-registration, learning on stand-by, learning in progress) and request registration or release to the base station according to a determined mode. For example, a terminal may determine a learning mode based on load and mobility. Embodiments concerning determination of a learning mode and registration/release signaling will be described with reference to FIG. 36 or FIG. 37 below.

Figure 36:
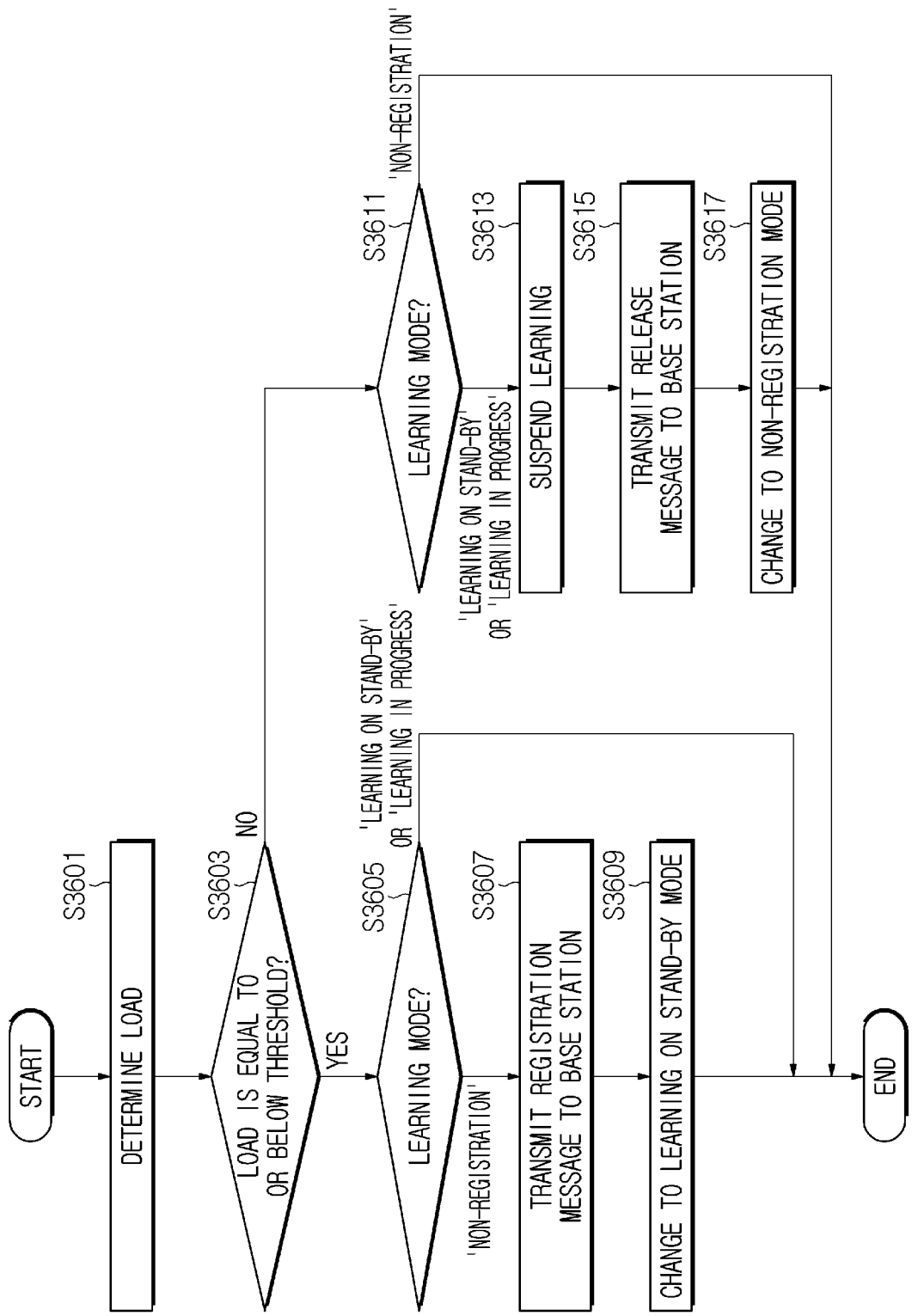
FIG. 36 is a view showing an embodiment of a procedure for controlling a learning mode applicable to the present disclosure.

FIG. 36 is a view showing an embodiment of a procedure for controlling a learning mode applicable to the present disclosure. FIG. 36 illustrates an operating method of a terminal that controls a learning mode based on load.

Referring to FIG. 36, at step S3601, a terminal determines a load. The terminal may identify at least one of an amount of data (e.g., traffics, control messages) transmitted or received for a service, which is being currently consumed, and an available resource (e.g., a memory resource, a computation resource, a power resource).

At step S3603, the terminal checks whether or not the load is equal to or below a threshold. In other words, the terminal determines, based on the load, whether or not there is a resource to be allocated for supporting learning. Herein, in case multiple types of loads are considered, the terminal may determine one representative value by combining multiple types of loads and then compare the representative value with the threshold. Alternatively, the terminal may sequentially compare multiple types of loads with corresponding thresholds.

In case a load is equal to or below a threshold, at step S3605, the terminal checks a learning mode. Herein, the learning mode may be one of 'learning in progress', 'learning on stand-by', and 'non-registration'. In case the learning mode is 'learning in progress' or 'learning on stand-by', the terminal ends this procedure. That is, since the state is already capable of learning, no change of learning mode is required. On the other hand, in case the learning mode is 'non-registration', at step S3607, the terminal transmits a registration message to a base station. That is, the terminal requests registration to a pool to the base station. At step S3609, the terminal changes to the learning on stand-by mode. Although not shown in FIG. 36, when configuration information for learning is received later from the base station, the terminal may change to the learning in progress mode.

On the other hand, in case the load exceeds a threshold, at step S3611, the terminal checks a learning mode. Herein, the learning mode may be one of 'learning in progress', 'learning on stand-by', and 'non-registration'. In case the learning mode is 'non-registration', the terminal ends this procedure. That is, since the state is already capable of learning, no change of learning mode is required. On the other hand, in case the learning mode is 'learning in progress' or 'learning on stand-by', at step S3613, the terminal suspends learning. However, in case learning is not currently performed, this step may be skipped. At step S3615, the terminal transmits a release message to the base station. In other words, the terminal requests the base station to remove it from the pool. At step S3617, the terminal changes to the non-registration mode.

Figure 37:
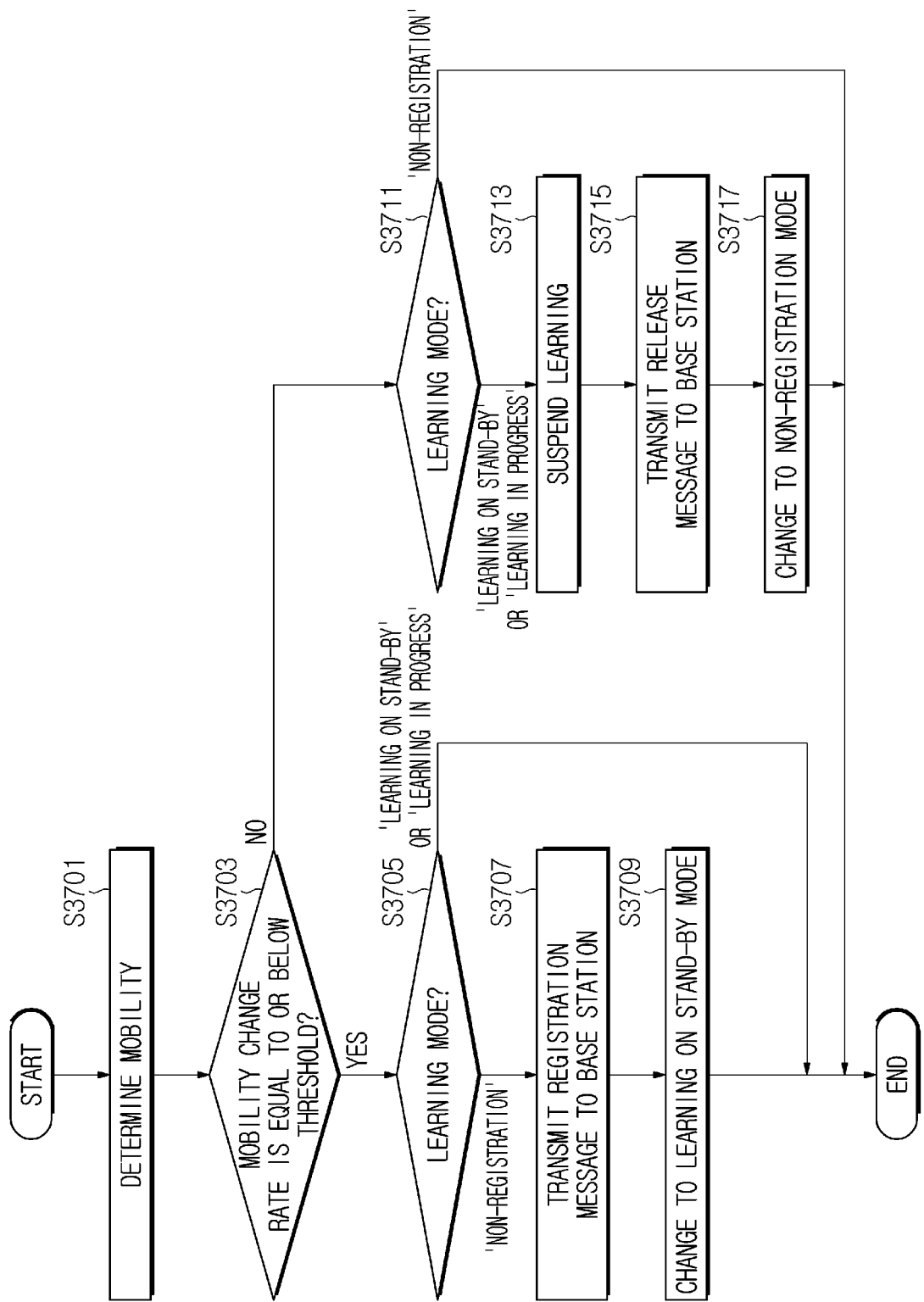
FIG. 37 is a view showing another embodiment of a procedure for controlling a learning mode applicable to the present disclosure.

FIG. 37 is a view showing another embodiment of a procedure for controlling a learning mode applicable to the present disclosure. FIG. 37 illustrates an operating method of a terminal that controls a learning mode based on mobility.

Referring to FIG. 37, at step S3701, a terminal determines mobility. The terminal estimates a change of channel, a change of doppler frequency or location and the like and determines mobility of the terminal (e.g., whether or not it moves, a moving speed) based on an estimate result. For example, mobility may be evaluated by several predefined categories.

At step S3703, the terminal checks whether or not a change rate of mobility is equal to or below a threshold. For example, the terminal compares a change of moving speed per unit time and a threshold. When a change rate of mobility is large, a machine learning model updated through learning is difficult to rely on. Accordingly, the terminal may check determination results of mobility for a predetermined period, quantify a degree of change of mobility and compare a quantified degree of change of mobility with a threshold.

In case a change rate of mobility is equal to or below a threshold, at step S3705, the terminal checks a learning mode. Herein, the learning mode may be one of 'learning in progress', 'learning on stand-by', and 'non-registration'. In case the learning mode is 'learning in progress' or 'learning on stand-by', the terminal ends this procedure. That is, since the state is already capable of learning, no change of learning mode is required. On the other hand, in case the learning mode is 'non-registration', at step S3707, the terminal transmits a registration message to a base station. That is, the terminal requests registration to a pool to the base station. At step S3709, the terminal changes to the learning on stand-by mode. Although not shown in FIG. 37, when configuration information for learning is received later from the base station, the terminal may change to the learning in progress mode.

On the other hand, in case the change rate of mobility exceeds a threshold, at step S3711, the terminal checks a learning mode. Herein, the learning mode may be one of 'learning in progress', 'learning on stand-by', and 'non-registration'. In case the learning mode is 'non-registration', the terminal ends this procedure. That is, since the state is already capable of learning, no change of learning mode is required. On the other hand, in case the learning mode is 'learning in progress' or 'learning on stand-by', at step S3713, the terminal suspends learning. However, in case learning is not currently performed, this step may be skipped. At step S3715, the terminal transmits a release message to the base station. In other words, the terminal requests the base station to remove it from the pool. At step S3717, the terminal changes to the non-registration mode.

(2) Participant Terminal Selection and Configuration Procedure

When a registration or a release message is received from terminals, a base station constructs a pool and controls a learning procedure. For this, the base station selects a terminal that will participate in learning. Herein, the base station may determine first whether or not to perform learning. An embodiment concerning determining whether or not to perform learning and selection of a terminal is described with reference to FIG. 38 below.

Figure 38:
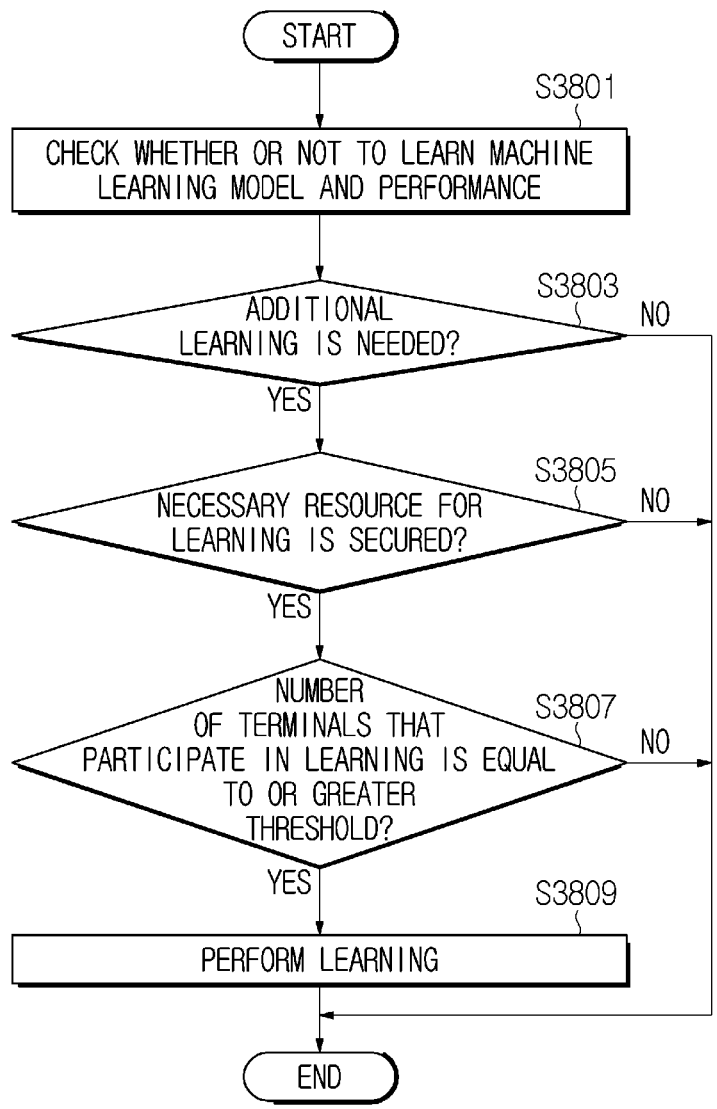
FIG. 38 is a view showing an embodiment of a procedure for controlling the progress of learning in a base station applicable to the present disclosure.

FIG. 38 is a view showing an embodiment of a procedure for controlling the progress of learning in a base station applicable to the present disclosure. FIG. 38 illustrates an operating method of a base station.

Referring to FIG. 38, at step S3801, the base station checks whether or not a machine learning mode is learned and its performance. That is, the base station checks whether or not learning of the machine learning mode has been performed at least once and evaluates the performance of the machine learning model. For example, the performance of the machine learning model may be evaluated based on at least one of whether or not an optimizing operation is performed, a block error rate (BER), and a time elapsed from latest learning.

At step S3803, the base station determines whether or not additional learning is needed. That is, based on the performance of the machine learning model, the base station may determine whether or not additional learning is needed. For example, in case optimization for the machine learning model of the base station has never been performed, in case the optimization for the machine learning mode of the base station has been performed but downlink channel estimation performance is determined to be below a standard, or in case learning of the machine learning model of the base station has not been performed for a specific period of time (e.g., one week, one month), the base station may determine that additional learning is needed. Herein, in case the performance is equal to or below a standard, a BER, which is a statistical analysis result for hybrid automatic repeat request (HARQ) ACK/NACK feedback of data transmitted based on a downlink estimation channel of a terminal through the machine learning model, may be equal to or below a threshold. In case no additional learning is needed, the base station ends this procedure.

On the other hand, when additional learning is needed, at step S3805, the base station determines whether or not a resource necessary for learning is secured. For example, the base station may check usage of a resource (e.g., processor load, wireless resource), which is being managed, and determine whether or not it is possible to allocate as many resources as necessary for learning. In case a resource is not secured, the base station ends this procedure.

On the other hand, when a resource is secured, at step S3807, the base station checks whether or not a number of terminals, which will participate in learning, is equal to or greater than a threshold. The terminals that will participate in learning include terminals added to a pool in response to a request of registration. Accordingly, the base station checks a number of terminals registered to a terminal pool and compares a number thus identified with a threshold. That is, the base station checks whether or not terminals capable of participating in learning have been secured to a certain number or above. In case the number of terminals, which will participate in learning, is below the threshold, the base station ends this procedure.

On the other hand, when the number of terminals, which will participate in learning, is equal to or greater than the threshold, at step S3809, the base station performs learning. For example, in order to start learning, the base station selects a terminal that will participate in learning. In other words, the base station selects at least one terminal, which will participate in learning, from the terminal pool that is managed. For example, the base station may select terminals by considering at least one of a resource currently available at the base station (e.g., a downlink resource, an uplink resource), an expected location of a terminal, a moving speed of a terminal, and intensity of receiving an uplink reference signal. After selecting the terminals, the base station transmits terminal configuration information necessary for collecting data required for learning of a machine learning model of the base station and then transmits a downlink reference signal.

When considering an expected location of a terminal, the base station may further perform an operation of estimating a location of the terminal. The expected location of a terminal may be considered to prevent terminals distributed intensively in a specific location from being selected. For example, the base station may select terminals so that the selected terminals are evenly distributed within coverage.

When considering a moving speed of a terminal, the base station may further perform an operation of estimating a moving speed. The moving speed of a terminal may be considered to select terminals suitable for a model to be trained among machine learning models which are classified according to moving speeds. For example, the base station may select at least one terminal among terminals having a moving speed corresponding to a model to be trained.

When considering reception intensity of an uplink reference signal, the base station may further perform an operation of measuring the reception intensity of the uplink reference signal. Herein, the uplink reference signal may include a reference signal which is transmitted for a purpose other than learning or according to a procedure not for learning. The reception intensity of an uplink reference signal may be considered to exclude a terminal with too poor channel quality. For example, the base station may select at least one terminal among terminals that transmit an uplink reference signal with a reception intensity equal to or greater than a threshold.

In addition, the base station allocates a resource necessary for learning. In order to obtain labeled data for estimating a downlink channel through an uplink channel, the base station is configured to prevent a channel change from occurring between a transmission timestep of an uplink reference signal and a transmission timestep of a downlink reference signal. When there is a large time gap between an uplink reference signal transmission timestep measured at the base station and a downlink reference signal transmission timestep measured at a terminal, a channel change may occur. In this case, accurate labeled data may be difficult to acquire. Accordingly, the base station allocates a resource so that a timestep for a terminal to transmit an uplink reference signal and a timestep for the base station to transmit a downlink reference signal are located within a channel coherence time. Herein, the coherence time means a time in which a wireless channel is considered not to change.

(3) Reporting Procedure

When a learning procedure is performed by a base station, a terminal provides a signal or information necessary to support learning. The signal or information provided by the terminal is used to derive data for learning or data. In other words, the base station creates a training data set and a test data set by using the information or signal provided by the terminal.

Figure 39:
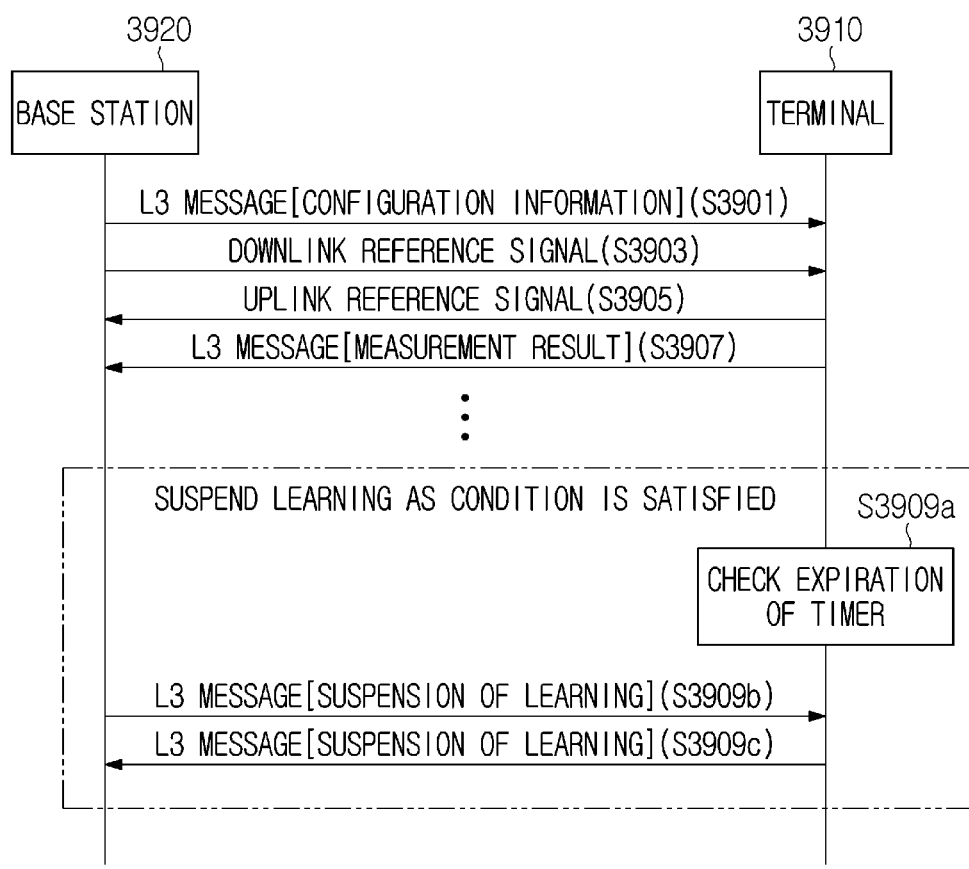
FIG. 39 is a view showing another embodiment of signal exchange for learning between a base station and a terminal, which is applicable to the present disclosure.

FIG. 39 is a view showing another embodiment of signal exchange for learning between a base station and a terminal, which is applicable to the present disclosure. FIG. 39 illustrates exchange of messages and signals between a terminal 3910 and a base station 3920. Although FIG. 39 shows only one terminal, the base station 3920 may perform the procedure of FIG. 39 with a plurality of terminals including the terminal 3910.

Referring to FIG. 39, at step S3901, the base station 3920 transmits an L3 (layer-3) message including configuration information to the terminal 3910. Herein, the configuration information includes information necessary to participate in learning. For example, the configuration information may include at least one of information related to progress of learning, resource allocation information for reference signals, format and resource allocation information for reporting a measurement result.

At step S3903, the base station 3920 transmits a downlink reference signal to the terminal 3910. Accordingly, the terminal 3910 may estimate a downlink channel by using the downlink reference signal. At step S3905, the terminal 3910 transmits an uplink reference signal to the base station 3920. Accordingly, the base station 3920 may estimate an uplink channel by using the uplink reference signal. That is, the terminal 3910 starts measurement for the downlink reference signal according to configuration information received from the base station 3920 and simultaneously transmits the uplink reference signal to the base station 3920 according to the configuration information. When necessary, such a measuring and transmitting operation may be iteratively performed.

At step S3907, the terminal 3910 transmits an L3 message including a measurement result to the base station 3920. Herein, the measurement result includes a result of downlink channel estimation using the downlink reference signal. For example, the measurement result may include at least one of a channel matrix, a codeword index, and a compressed channel matrix. The base station 3920 may construct, in a pair form, uplink channel information estimated from the uplink reference signal and the measurement result reported by the terminal 3910 and store them in a memory in a form of labeled data.

Next, when a given condition is satisfied, learning is suspended. For example, learning may be suspended by one operation of step S3909*a*, step S3909*b* and step S3909*c*. Until at least one of the operations at steps S3909*a*, S3909*b* and S3909*c* occurs, learning may continue.

At step S3909*a*, the terminal 3910 checks expiration of a timer. The timer may be included in the configuration information received at step S3901. That is, the terminal 3910 may suspend learning after a predetermined time and go into a learning stand-by mode.

At step S3909*b*, the base station 3920 may transmit an L3 message for indicating suspension of learning to the terminal 3910. After collecting a predetermined amount of learning data from a plurality of terminals including the terminal 3910 for a predetermined time, the base station 3920 performs machine learning model learning by using the collected learning data. Accordingly, when a sufficient amount of learning data is collected, the base station 3920 may transmit a message for indicating suspension of learning.

At step S3909*c*, the terminal 3910 may transmit an L3 message for requesting suspension of learning to the base station 3920. The message for requesting suspension of learning may be transmitted based on determination of the terminal 3910 according to situations (e.g., determination based on load and mobility). For example, the terminal 3910 periodically checks terminal load and mobility, and when a situation does not allow learning to go on, the terminal 3910 transmits a message for requesting suspension of learning and ends the learning in progress mode.

In an embodiment described with reference to FIG. 39, a terminal estimates a downlink channel and reports an estimation result to a base station. Herein, according to an embodiment, the base station may request the terminal to use a machine learning model in order to measure downlink channel information. Generally, in order to reduce uplink resource overhead for reporting a downlink channel, instead of channel information itself, an index of an optimal codeword selected in a codebook based on the channel information is given as feedback. However, as machine learning is utilized for communication and thus a machine learning mode is utilized to report channel information, techniques of significantly reducing uplink resources can be used. Thus, the present disclosure proposes an embodiment of utilizing a machine learning model in reporting downlink channel information.

According to an embodiment, in the participant terminal selection and configuration procedure, a base station forwards a machine learning model to be used for estimating a downlink channel to every terminal. Using the machine learning model thus obtained, a terminal may estimate a downlink channel and transmit a corresponding output to the base station. Herein, an input of the machine learning model may be derived from a received value of a downlink reference signal. Corresponding effects are as follows. First, when machine learning is used, a feature of downlink channel information may be easily extracted. Accordingly, as only the feature of downlink channel information is extracted and transmitted to a base station, the amount of resource sent from a terminal to the base station may be reduced. Second, since every terminal uses a common machine learning model to obtain downlink channel information, the measurement error of downlink channel information among terminals, which is caused by various implementation methods, may be reduced. Third, as a base station utilizes a machine learning model provided to a terminal, the base station may control downlink channel information, which is created using the machine learning model at a terminal, to have a data form necessary for learning of the base station. Thus, a data processing time and resources necessary for learning of the base station may be reduced.

(4) Learning and Validation Procedure

When learning data are all collected through a reporting procedure from a terminal selected in the participant terminal selection and configuration procedure, a base station performs learning for a machine learning model. Learning data may be distinguished into a training data set and a test data set, and supervision learning may be performed. Herein, input data may include uplink channel information $H_{UL}$ derived from an uplink reference signal of a terminal, and labeled data may include downlink channel information $H_{DL}$ that is measured and reported by the terminal from a downlink reference signal.

A learned machine learning model is validates using a test data set. For example, an inference result using input data included in the test data set is compared with the labeled data, and when a comparison result shows that an indicator representing a difference between them exceeds a threshold, validation fails. In case a validation criterion is not satisfied, the participant terminal selection procedure may be performed again.

(5) Updated Machine Learning Model Application Procedure

When a machine learning model is updated through learning, a channel may be estimated using the machine learning model. Using the machine learning model, a base station predicts a downlink channel from an uplink reference signal of a terminal. That is, the base station may perform prediction for a downlink channel by putting an input value obtained from an uplink reference signal to the machine learning model and by performing an inference operation. The base station may derive parameters for precoding or beamforming necessary for downlink data transmission by using the estimated downlink channel information and may transmit downlink data by using a parameter thus derived.

Then, when necessary, learning of the machine learning model may performed again. In case the learning is to be performed again, the base station may use a pool of terminals already registered. Alternatively, the base station may transmit a message for inducing registration to a pool. Since terminals registered to the pool may change, the learning may be performed with terminals that belong to a different set from that of previous learning.

As described above, learning of a machine learning mode may be performed for channel estimation, and a channel may be estimated using a learned machine learning model. According to an embodiment, a base station may learn a plurality of machine learning models and estimate a channel by using a plurality of machine learning models. That is, the base station may operate a plurality of machine learning models and selectively use a machine learning model suitable for a condition and/or a situation.

Figure 40:
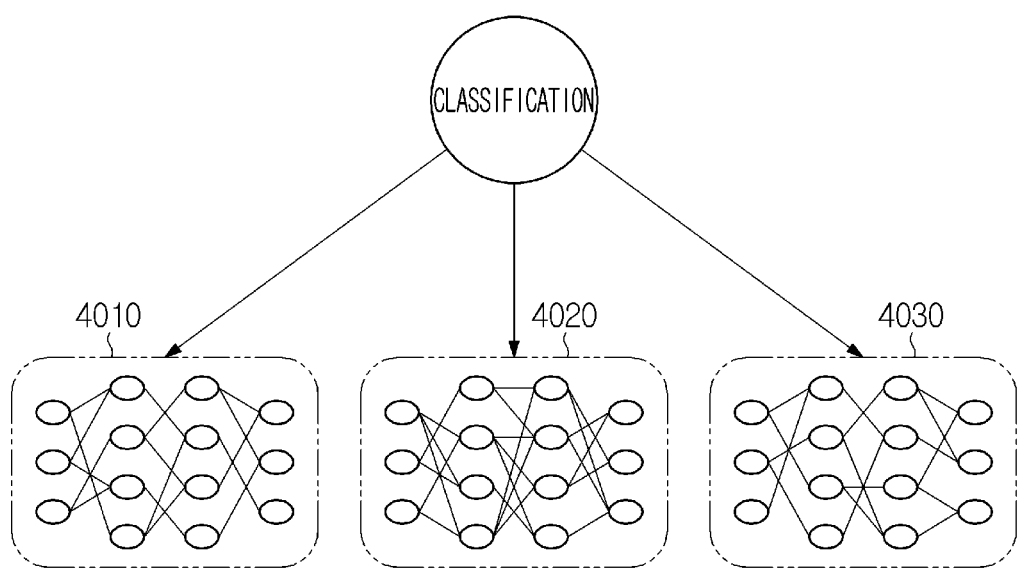
FIG. 40 is a view showing an example classification of a plurality of machine learning models applicable to the present disclosure.

FIG. 40 is a view showing an example classification of a plurality of machine learning models applicable to the present disclosure. Referring to FIG. 40, a first model 4010, a second model 4020 and a third model 4030 may be operated, conditions and/or situations may be classified according to a given variable, and one of the first model 4010, the second model 4020 and the third model 4030 may be selectively used. For example, a criterion of classification may be defined based on at least one of a feature of a terminal related to a channel to be estimated (e.g., moving speed, distance to base station), a congestion degree of a cell, a magnitude of interference from a neighboring cell, and a time zone.

Through the various embodiments described above, a base station may learn a machine learning model online in real time for performing downlink channel prediction from an uplink reference signal. Accordingly, based on a machine learning model optimized for a base station environment, overhead (e.g., channel state information (CSI)-reference signal (RS) transmission resource, CSI feedback resource, latency) necessary for obtaining downlink channel information in a communication system may be reduced.

In addition, a system may run a machine learning model optimized for each cell environment. Specifically, by collecting learning data from terminals that are evenly distributed within each terminal, the system may learn various channel environments of a base station, perform downlink estimation of every terminal by using a same model and reduce an estimation error.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Moreover, it will be apparent that some claims referring to specific claims may be combined with another claims referring to the other claims other than the specific claims to constitute the embodiment or add new claims by means of amendment after the application is filed.

INDUSTRIAL AVAILABILITY

The embodiments of the present disclosure are applicable to various radio access systems. Examples of the various radio access systems include a 3$^{rd}$ generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method performed by a user equipment (UE) in a wireless communication system, the method comprising:
   receiving, from a base station, a first message including configuration information related to an uplink reference signal;
   transmitting the uplink reference signal based on the configuration information;
   receiving a downlink reference signal that is transmitted by the base station; and
   transmitting information related to a channel measured based on the downlink reference signal,
   wherein the first message includes information related to learning with respect to a machine learning model for measuring the channel, and
   wherein the learning is performed by the base station.

2. The method of claim 1, further comprising transmitting, to the base station, a second message related to a registration,
   wherein the second message includes information related to the learning.

3. The method of claim 2, wherein the second message includes at least one of information related to learning support capability of the UE, information notifying a state related to the learning, and information requesting a change of the state related to the learning.

4. The method of claim 2, wherein the first message includes at least one of information related to progress of the learning, information indicating a resource for the downlink reference signal, information indicating a resource for the uplink reference signal, and information for reporting a measurement result of the downlink channel.

5. The method of claim 2, wherein the first message includes information related to a machine learning model for measuring the downlink channel, and
   further comprising inferring the downlink channel by using the downlink reference signal and the machine learning model.

6. The method of claim 2, further comprising determining a learning mode based on at least one of a load and a mobility change rate of the UE,
   wherein the second message includes information requesting change into the determined learning mode.

7. The method of claim 6, wherein the determining of the learning mode comprises:
   selecting a mode for suspending learning based on the load or the mobility change rate exceeding a threshold; and
   selecting a mode for performing learning or of standing by to perform learning.

8. The method of claim 2, wherein the transmitting of the second message comprises transmitting, at an initial access, a capability information message which includes information related to learning support capability of the UE.

9. The method of claim 2, wherein the transmitting of the second message further comprises transmitting a message for requesting registration to a UE pool for learning based on a state change of the UE.

10. The method of claim 2, wherein the second message includes information indicating a learning period, and
   further comprising ending learning after the learning period.

11. A user equipment (UE) in a wireless communication system, the UE comprising:
   a transceiver; and
   at least one processor coupled to the transceiver and configured to:
   receive, from a base station, a first message including configuration information related to an uplink reference signal;
   transmit the uplink reference signal based on the configuration information;
   receive a downlink reference signal that is transmitted by the base station; and
   transmit information related to a channel measured based on the downlink reference signal,
   wherein the first message includes information related to learning with respect to a machine learning model for measuring the channel, and
   wherein the learning is performed by the base station.

12. The UE of claim 11, wherein the at least one processor is further configured to transmit, to the base station, a second message related to a registration,
   wherein the second message includes information related to the learning.

13. The UE of claim 12, wherein the second message comprises a capability information message which includes information related to learning support capability of the UE.

14. The UE of claim 12, wherein the second message includes at least one of information related to learning support capability of the UE, information notifying a state related to the learning, and information requesting a change of the state related to the learning.

15. The UE of claim 12, wherein the first message includes at least one of information related to progress of the learning, information indicating a resource for the downlink reference signal, information indicating a resource for the uplink reference signal, and information for reporting a measurement result of the downlink channel.

16. The UE of claim 12, wherein the first message includes information related to a machine learning model for measuring the downlink channel, and
   further comprising inferring the downlink channel by using the downlink reference signal and the machine learning model.

17. The UE of claim 12, further comprising determining a learning mode based on at least one of a load and a mobility change rate of the UE,
   wherein the second message includes information requesting change into the determined learning mode.

18. The UE of claim 12, wherein the transmitting of the second message further comprises transmitting a message for requesting registration to a UE pool for learning based on a state change of the UE.

19. The UE of claim 12, wherein the second message includes information indicating a learning period, and
further comprising ending learning after the learning period.

20. A communication apparatus comprising:
at least one processor; and
at least one computer memory operably connected to the at least one processor and storing instructions that, based on being executed by the at least one processor, perform operations comprising:
receiving a first message including configuration information related to an uplink reference signal;
transmitting the uplink reference signal based on the configuration information;
receiving a downlink reference signal that is transmitted by a base station; and
transmitting information related to a channel measured based on the downlink reference signal,
wherein the first message includes information related to learning with respect to a machine learning model for measuring the channel, and
wherein the learning is performed by the base station.

* * * * *